US012579120B2

(12) United States Patent
Zhu et al.

(10) Patent No.: US 12,579,120 B2
(45) Date of Patent: **\*Mar. 17, 2026**

(54) TUNING LARGE DATA INFRASTRUCTURES

(71) Applicant: Microsoft Technology Licensing, LLC, Redmond, WA (US)

(72) Inventors: Yiwen Zhu, Sunnyvale, CA (US); Subramaniam Venkatraman Krishnan, Santa Clara, CA (US); Konstantinos Karanasos, San Francisco, CA (US); Carlo Curino, Woodinville, WA (US); Isha Tarte, Woodinville, WA (US); Sudhir Darbha, Redmond, WA (US)

(73) Assignee: Microsoft Technolgy Licensing, LLC., Redmond, WA (US)

( * ) Notice: Subject to any disclaimer, the term of this patent is extended or adjusted under 35 U.S.C. 154(b) by 47 days.

This patent is subject to a terminal disclaimer.

(21) Appl. No.: 18/534,559

(22) Filed: Dec. 8, 2023

(65) Prior Publication Data

US 2024/0111739 A1    Apr. 4, 2024

Related U.S. Application Data

(63) Continuation of application No. 17/221,755, filed on Apr. 2, 2021, now Pat. No. 11,880,347.

(30) Foreign Application Priority Data

Nov. 23, 2020    (IN) ............................. 202041050978

(51) Int. Cl.
  *G06N 20/00*     (2019.01)
  *G06F 11/30*     (2006.01)
    (Continued)

(52) U.S. Cl.
  CPC ........ *G06F 16/217* (2019.01); *G06F 11/3006* (2013.01); *G06F 11/3433* (2013.01);
    (Continued)

(58) Field of Classification Search
  CPC .... G06F 16/217; G06F 16/182; G06F 16/188; G06F 16/1727; G06F 16/1734;
    (Continued)

(56) References Cited

U.S. PATENT DOCUMENTS 8,612,599 B2 * 12/2013 Tung ................... H04L 41/5025
                                                          709/224
9,378,112 B2    6/2016 Banerjee
                    (Continued)

FOREIGN PATENT DOCUMENTS

EP         2960797 A1 * 12/2015
WO    WO 2010121017 A2 * 10/2010
              (Continued)

OTHER PUBLICATIONS

Binlei Cai et al., "On evaluating the resource usage effectiveness of multi-tenant cloud storage", Journal of Systems Architecture vol. 98, Sep. 2019, pp. 403-412.*

(Continued)

*Primary Examiner* — Srirama Channavajjala
(74) *Attorney, Agent, or Firm* — Barta Jones, PLLC

(57)         ABSTRACT

An automated tuning service is used to automatically tune, or modify, the operational parameters of a large-scale cloud infrastructure. The tuning service performs automated and fully data/model-driven configuration based from learning various real-time performance of the cloud infrastructure. Such performance is identified through monitoring various telemetric data of the cloud infrastructure. The tuning service leverages a mix of domain knowledge and principled data-science to capture the essence of our cluster dynamic (Continued)

behavior in a collection of descriptive machine learning (ML) models. The ML models power automated optimization procedures for parameter tuning, and inform administrators in most tactical and strategical engineering/capacity decisions (such as hardware and datacenter design, software investments, etc.). Rich "observational" models (models collected without modifying the system) are combined with judicious use of "fighting" (testing in production), allowing the tuning service to automatically configure operational parameters of a large cloud infrastructure for a broad range of applications.

20 Claims, 15 Drawing Sheets

(51) Int. Cl.

| | | |
|---|---|---|
| *G06F 11/34* | (2006.01) | |
| *G06F 16/17* | (2019.01) | |
| *G06F 16/182* | (2019.01) | |
| *G06F 16/188* | (2019.01) | |
| *G06F 16/21* | (2019.01) | |

(52) U.S. Cl.
CPC ...... *G06F 16/1727* (2019.01); *G06F 16/1734* (2019.01); *G06F 16/182* (2019.01); *G06F 16/1834* (2019.01); *G06F 16/188* (2019.01); *G06N 20/00* (2019.01)

(58) Field of Classification Search
CPC ............ G06F 16/1834; G06F 11/3006; G06F 11/3433; G06F 11/3093; G06F 11/3495; G06N 20/00
See application file for complete search history.

(56) References Cited

U.S. PATENT DOCUMENTS

| | | | | |
|---|---|---|---|---|
| 9,438,648 | B2 * | 9/2016 | Asenjo | H04L 67/535 |
| 10,198,339 | B2 | 2/2019 | Salunke et al. | |
| 10,270,668 | B1 | 4/2019 | Thompson et al. | |
| 10,404,524 | B2 | 9/2019 | Velipasaoglu et al. | |
| 10,445,217 | B2 | 10/2019 | Parthasarathy et al. | |
| 10,628,252 | B2 | 4/2020 | Wang et al. | |
| 10,671,507 | B2 | 6/2020 | Prabath et al. | |
| 11,212,195 | B1 * | 12/2021 | Tamir | G06F 11/302 |
| 11,392,843 | B2 * | 7/2022 | Desai | G06N 3/08 |
| 2009/0141854 | A1 | 6/2009 | Hirokawa et al. | |
| 2011/0022812 | A1 * | 1/2011 | van der Linden | H04L 69/08 |
| | | | | 711/E12.001 |
| 2012/0226644 | A1 * | 9/2012 | Jin | G06N 3/045 |
| | | | | 706/19 |
| 2013/0185729 | A1 * | 7/2013 | Vasic | G06F 9/5072 |
| | | | | 718/104 |
| 2013/0311481 | A1 | 11/2013 | Bhatt et al. | |
| 2015/0067404 | A1 * | 3/2015 | Eilam | G06F 11/3093 |
| | | | | 714/38.1 |
| 2015/0156213 | A1 | 6/2015 | Baker | |
| 2015/0180744 | A1 | 6/2015 | Joshi et al. | |
| 2015/0379429 | A1 | 12/2015 | Lee et al. | |
| 2016/0139885 | A1 * | 5/2016 | Dube | H04L 41/5006 |
| | | | | 717/101 |
| 2017/0289226 | A1 | 10/2017 | Deshpande et al. | |
| 2018/0218269 | A1 | 8/2018 | Oliner et al. | |
| 2018/0248745 | A1 * | 8/2018 | Ahmed | G06F 11/079 |
| 2018/0276256 | A1 | 9/2018 | Sarkar et al. | |
| 2019/0034392 | A1 | 1/2019 | Medlyn | |
| 2019/0066661 | A1 * | 2/2019 | Kurata | G10L 15/065 |
| 2019/0173765 | A1 * | 6/2019 | Bertran | H04L 41/5032 |
| 2019/0188584 | A1 | 6/2019 | Rao | |
| 2019/0265971 | A1 | 8/2019 | Behzadi et al. | |
| 2019/0306045 | A1 * | 10/2019 | Avdesh Khanna | H04L 67/10 |
| 2020/0042799 | A1 | 2/2020 | Huang et al. | |
| 2020/0057933 | A1 | 2/2020 | Cosgrove et al. | |
| 2020/0201727 | A1 | 6/2020 | Nie et al. | |
| 2020/0250178 | A1 | 8/2020 | Boster et al. | |
| 2020/0267057 | A1 | 8/2020 | Garvey et al. | |
| 2020/0284883 | A1 | 9/2020 | Ferreira et al. | |
| 2020/0295999 | A1 * | 9/2020 | Anandam | H04L 67/025 |
| 2020/0401702 | A1 | 12/2020 | Karabatis | |
| 2021/0004461 | A1 | 1/2021 | Guilley | |
| 2021/0117719 | A1 * | 4/2021 | Tiwary | G06N 7/01 |
| 2021/0209502 | A1 * | 7/2021 | Vasudevan | G06F 18/217 |
| 2021/0216338 | A1 * | 7/2021 | Silva | G06F 9/455 |
| 2021/0344745 | A1 * | 11/2021 | Mermoud | G06N 3/0895 |
| 2022/0021593 | A1 * | 1/2022 | Varnavas | H04L 41/5009 |
| 2022/0086060 | A1 | 3/2022 | Tamir et al. | |
| 2022/0114473 | A1 * | 4/2022 | Awasthy | G06N 3/045 |

FOREIGN PATENT DOCUMENTS

| | | | |
|---|---|---|---|
| WO | WO 2017/010922 A1 * | 1/2017 | |
| WO | WO 2020019017 A1 * | 1/2020 | |

OTHER PUBLICATIONS

Mahdee Jodayree et al., "A Predictive Workload Balancing Algorithm in Cloud Services"Procedia Computer Science, vol. 159, 2019, pp. 902-912.*

Philippe J. Giabbanelli, "Solving Challenges at the Interface of Simulation and Big Data Using Machine Learning", 2019 Winter Simulation Conference (WSC) (2019, pp. 572-583).*

International Search Report and Written Opinion received for PCT Application No. PCT/US2021/034678, (MS# 408867-PCT01) mailed on Aug. 27, 2021, 13 Pages.

Non-Final Office Action mailed on Dec. 7, 2022, in U.S. Appl. No. 17/537,387, (MS# 408867-U802-CON) 20 Pages.

Non-Final Office Action mailed on Jun. 18, 2021, in U.S. Appl. No. 17/019, 187, (MS# 408867-US01) 17 Pages.

Notice of Allowance mailed on Apr. 5, 2023, in U.S. Appl. No. 17/537,387, (MS#408867-US02-CON) 10 pages.

Notice of Allowance mailed on Aug. 24, 2021, in U.S. Appl. No. 17/019,187, (MS# 408867-US01) 8 Pages.

Ren, et al., "Time-Series Anomaly Detection Service at Microsoft", In Proceedings of the 25th ACM SIGKDD International Conference on Knowledge Discovery & Data Mining, Aug. 4, 2019, pp. 3009-3017.

\* cited by examiner

CPU Utilization

Task execution time (s)

1100

Access telemetric data — 1102

Join telemetric data with various sources — 1104

Calculate performance metrics — 1106

Identify optimal configurations of cloud operational parameters based on performance metrics — 1108

Deploy optimal configurations of cloud operational parameters to machines of cloud infrastructure — 1110

TUNING LARGE DATA INFRASTRUCTURES

CROSS-REFERENCE TO RELATED APPLICATIONS

This application is a continuation of and claims priority to U.S. application Ser. No. 17/221,755, filed on Apr. 2, 2023 and entitled "TUNING LARGE DATA INFRASTRUC-TURES," which claims the benefit of U.S. Indian Application Number 202041050978 filed on Nov. 23, 2020 and entitled "TUNING LARGE DATA INFRASTRUC-TURES," which are hereby incorporated by reference for all intents and purposes.

BACKGROUND

Cloud infrastructures have empowered users with unprecedented ability to store and process large amounts of data, paving the road for revolutions in the areas of web search, analytics, machine learning (ML), artificial intelligence (AI), and the translation of nearly every facet of modern life into digital systems. Such cloud infrastructures require numerous pieces of hardware, services, and operational parameters to be tuned for them to operate as efficiently and reliably as possible. Operating large-scale cloud infrastructures is a costly and complex endeavor, and efficiency is paramount. And, given the significance and complexity of these cloud infrastructures, many aspects may be carefully tuned by a dedicated team to optimize efficiency, improve performance, and reduce operational costs. But these tuning efforts are either manually driven (which are limited) or automated through machine learning (ML) approaches that are not scalable to today's larger infrastructures (e.g., able to handle exabytes of data).

Manual tuning is both time-consuming and error prone. Also, it requires continued adjustments as workloads shift and new hardware and software is deployed. Having no rigorous way to evaluate the current choice of parameters and suggest new more promising values leads to significant missed opportunities in terms of operational cost and performance.

Conventional ML approaches for tuning operational cloud parameters are impractical for large-sale (e.g., exabyte) cloud infrastructures. Among them, the more practically viable ones have focused on small-scale settings—for example, to tune a single database management system (DBMS) instance—being based on the fundamental assumption of repeatedly changing tunable cloud parameters and running experiments to measure the resulting performance. This "experimental tuning" approach is unrealistic for large-scale cloud infrastructures. Deployments must roll out progressively across tens of thousands of machines, noisy workloads require long windows of observation (weeks, months, etc.), and running a bad configuration may have devastating effects on some of the most business-critical operations in the cloud.

SUMMARY

The disclosed examples are described in detail below with reference to the accompanying drawing figures listed below. The following summary is provided to illustrate some examples disclosed herein. It is not meant, however, to limit all examples to any particular configuration or sequence of operations.

Examples and implementations disclosed herein are directed to a data-driven tuning service for automatically tuning large-scale (e.g., exabyte) cloud infrastructures. The tuning service performs automated and fully data/model-driven configuration from learning various real-time performance of the cloud infrastructure. Such performance is identified through monitoring various telemetric data of the cloud infrastructure. The tuning service leverages a mix of domain knowledge and principled data-science to capture the essence of our cluster dynamic behavior in a collection of descriptive machine learning (ML) models. The ML models power automated optimization procedures for parameter tuning, and inform administrators in most tactical and strategical engineering/capacity decisions (such as hardware and datacenter design, software investments, etc.). Rich "observational" models (models collected without modifying the system) are combined with judicious use of "fighting" (testing in production), allowing the tuning service to automatically configure operational parameters of a large cloud infrastructure for a broad range of applications.

BRIEF DESCRIPTION OF THE DRAWINGS

The disclosed examples are described in detail below with reference to the accompanying drawing figures listed below:

FIG. 5 illustrates graphs showing task type distribution across rows and stock keeping units (SKUs) for different groups of machines is very similar;

DETAILED DESCRIPTION

Figure 1:
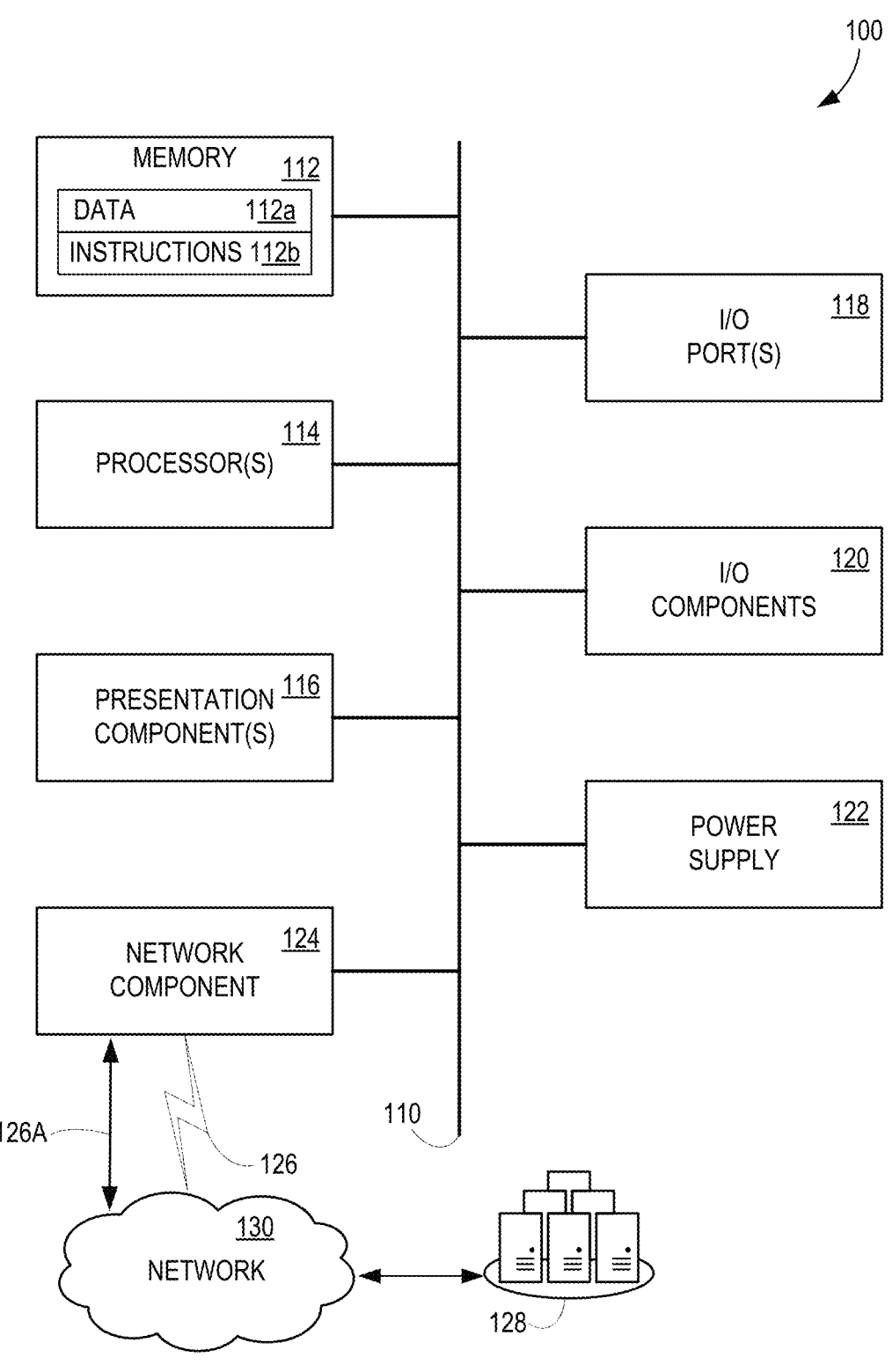
FIG. 1 illustrates a block diagram of a computing device.

The various embodiments will be described in detail with reference to the accompanying drawings. Wherever possible, the same reference numbers will be used throughout the drawings to refer to the same or like parts. References made throughout this disclosure relating to specific examples and implementations are provided solely for illustrative purposes but, unless indicated to the contrary, are not meant to limit all examples.

Configuration tuning is becoming one of the biggest challenges for large-scale (e.g., exabyte-scale) cloud infra-structures, which might easily have hundreds even thousands of parameters. To overcome the limits of manual tuning and smaller-scale ML models, the disclosed implementations and examples automate tuning for large-scale cloud infrastructures in which the tuning is fully, or at least partially, data- or model-driven, leveraging a mix of domain knowledge and principled data science to capture the essence of our cluster dynamic behavior in a set of machine learning (ML) models based on collected system data. These ML models power automated optimization for parameter tuning that is useful to inform administrators and leadership on strategic engineering and capacity decisions (such as hardware and data center design, software investments, etc.).

In particular, the disclosed implementations and examples provide automated data- and model-driven tuning of cloud infrastructure operational parameters. Embodiments systematically combine domain expertise and principled data science to capture the complex dynamic behavior of a big-data cloud infrastructure (or cluster) as a collection of "descriptive" and "predictive" ML models that describe and predict the cloud infrastructure's behavior. These models power automated optimization procedures and are used both for direct parameter tuning, but also to guide our leadership in tactical engineering and capacity decisions (such as hardware and data center design, software investments, etc.). The tuning service disclosed herein employs rich observational tuning (without requiring modification of the cloud infrastructure) and also uses conservative testing in production (also referred to as "fighting").

The term "operational parameter" is defined herein as the set of system configurations that impact the operation of the cloud environment. Examples of operational parameters include, without limitation, YARN configurations, hardware design configurations, such as RAM/SSD per machine, power provision limits, and software configuration for storage mapping. Also, the terms "cloud," "cloud environment," "cloud-computing environment," and "cloud infrastructure are used interchangeably and all mean a remote computing environment deployed across one or more regions, such as around the globe.

The disclosed implementations and examples define a methodology to cope with cloud infrastructure complexity and create compact, sound, and explainable models of a cloud infrastructure based on a set of tractable metrics. The tuning service also provides an end-to-end architecture for automated tuning and provide details for the three types of tuning that are enabled: (i) observational tuning, which employs models for picking the right parameters and avoiding costly rounds of experiments; (ii) hypothetical tuning, an ML-assisted methodology for planning; and (iii) experimental tuning, a fallback approach that judiciously performs experiments when it is not possible to predict the system behavior otherwise. Moreover, the tuning service also continuously tunes database clusters, which improves cloud efficiency and prolongs hardware resources, saving a substantial amount of money.

To provide a real-world example, the COSMOS data analytics platform developed and managed by the MICROSOFT CORPORATION® is discussed. COSMOS is one of the largest data infrastructures worldwide with hundreds of thousands of machines spread across several data centers. Cluster resources are spread across tens of thousands of users that submit about hundreds of thousands of analytics jobs daily. The vast majority of the submitted jobs are written in Scope, a structured query language- (SQL-) like dialect that uses C # and Python. Scope jobs are translated to Directed Acyclic Graph (DAG) operators that are spread for execution across several machines. Each job is comprised of up to hundreds of thousands of tasks, such as individual processes each executed in one container. A YARN-based resource manager is used for scheduling tasks and sharing cluster resources across jobs.

Along with scale comes heterogeneity. After a decade of operation, COSMOS involves many different hardware generations of machines (with varying CPU cores, memory, RAM, HDD/SSD) from various manufacturers and software configurations (e.g., mapping of drives to SSDs/HDDs). Hereafter, the term "stock keeping unit," or "SKU," refers to a hardware generation and "software configuration" or "SC" to refer to a software generation or version. Operating such a complex infrastructure requires tuning hundreds of parameters across user applications and the underlying infrastructure. The disclosed embodiments focus on infrastructure-level configurations, and in particular on cluster-wide configurations, as they are very impactful and traditionally harder to tune. At large scale (e.g., exabyte), cloud infrastructures cannot simply perform tuning based on a large number of experiments or sample (A/B) testing.

Having generally provided an overview of some of the disclosed examples, attention is drawn to the accompanying drawings to further illustrate some additional details. The illustrated configurations and operational sequences are provided to aid the reader in understanding some aspects of the disclosed examples. The accompanying figures are not meant to limit all examples, and thus some examples may include different components, devices, or sequences of operations while not departing from the scope of the disclosed examples discussed herein. In other words, some examples may be embodied or may function in different ways than those shown.

The implementations and examples disclosed herein may be described in the general context of computer code or machine- or computer-executable instructions, such as program components, being executed by a computer or other machine. Generally, program components include routines, programs, objects, components, data structures, and the like that refer to code, performs particular tasks, or implement particular abstract data types. The disclosed examples may be practiced in a variety of system configurations, including personal computers, laptops, smart phones, servers, VMs, mobile tablets, hand-held devices, consumer electronics, specialty computing devices, etc. The disclosed examples may also be practiced in distributed computing environments when tasks are performed by remote-processing devices that are linked through a communications network.

FIG. 1 is a block diagram of an example computing device 100 for implementing aspects disclosed herein, and is designated generally as computing device 100. Computing device 100 is but one example of a suitable computing environment and is not intended to suggest any limitation as to the scope of use or functionality of the examples disclosed herein. Neither should computing device 100 be interpreted as having any dependency or requirement relating to any one or combination of components/modules illustrated.

Computing device 100 includes a bus 110 that directly or indirectly couples the following devices: computer-storage memory 112, one or more processors 114, one or more presentation components 116, I/O ports 118, I/O components 120, a power supply 122, and a network component 124. While computing device 100 is depicted as a seemingly single device, multiple computing devices 100 may work together and share the depicted device resources. For example, memory 112 is distributed across multiple devices, and processor(s) 114 is housed with different devices. Bus 110 represents what may be one or more busses (such as an address bus, data bus, or a combination thereof). Although the various blocks of FIG. 1 are shown with lines for the sake of clarity, delineating various components may be accomplished with alternative representations. For example, a presentation component such as a display device is an I/O component in some examples, and some examples of processors have their own memory. Distinction is not made between such categories as "workstation," "server," "laptop," "hand-held device," etc., as all are contemplated within the scope of FIG. 1 and the references herein to a "computing device."

Memory 112 may take the form of the computer-storage memory device referenced below and operatively provide storage of computer-readable instructions, data structures, program modules and other data for the computing device 100. In some examples, memory 112 stores one or more of an OS, a universal application platform, or other program modules and program data. Memory 112 is thus able to store and access data 112a and instructions 112b that are executable by processor 114 and configured to carry out the various operations disclosed herein. In some examples, memory 112 stores executable computer instructions for an OS and various software applications. The OS may be any OS designed to the control the functionality of the computing device 100, including, for example but without limitation: WINDOWS® developed by the MICROSOFT CORPORA-TION®, MAC OS® developed by APPLE, INC.® of Cupertino, Calif, ANDROID™ developed by GOOGLE, INC.® of Mountain View, California, open-source LINUX®, and the like.

By way of example and not limitation, computer readable media comprise computer-storage memory devices and communication media. Computer-storage memory devices may include volatile, nonvolatile, removable, non-removable, or other memory implemented in any method or technology for storage of information such as computer-readable instructions, data structures, program modules, or the like. Computer-storage memory devices are tangible and mutually exclusive to communication media. Computer-storage memory devices are implemented in hardware and exclude carrier waves and propagated signals. Computer-storage memory devices for purposes of this disclosure are not signals per se. Example computer-storage memory devices include hard disks, flash drives, solid state memory, phase change random-access memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that may be used to store information for access by a computing device. In contrast, communication media typically embody computer readable instructions, data structures, program modules, or the like in a modulated data signal such as a carrier wave or other transport mechanism and include any information delivery media.

The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number of organizations of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein. In examples involving a general-purpose computer, aspects of the disclosure transform the general-purpose computer into a special-purpose computing device, CPU, GPU, ASIC, system on chip (SoC), or the like for provisioning new VMs when configured to execute the instructions described herein.

Processor(s) 114 may include any quantity of processing units that read data from various entities, such as memory 112 or I/O components 120. Specifically, processor(s) 114 are programmed to execute computer-executable instructions for implementing aspects of the disclosure. The instructions may be performed by the processor, by multiple processors within the computing device 100, or by a processor external to the client computing device 100. In some examples, the processor(s) 114 are programmed to execute instructions such as those illustrated in the flow charts discussed below and depicted in the accompanying figures. Moreover, in some examples, the processor(s) 114 represent an implementation of analog techniques to perform the operations described herein. For example, the operations are performed by an analog client computing device 100 and/or a digital client computing device 100.

Presentation component(s) 116 present data indications to a user or other device. Exemplary presentation components include a display device, speaker, printing component, vibrating component, etc. One skilled in the art will understand and appreciate that computer data may be presented in a number of ways, such as visually in a graphical user interface (GUI), audibly through speakers, wirelessly between computing devices 100, across a wired connection, or in other ways. I/O ports 118 allow computing device 100 to be logically coupled to other devices including I/O components 120, some of which may be built in. Example I/O components 120 include, for example but without limitation, a microphone, joystick, game pad, satellite dish, scanner, printer, wireless device, etc.

The computing device 100 may communicate over a network 130 via network component 124 using logical connections to one or more remote computers. In some examples, the network component 124 includes a network interface card and/or computer-executable instructions (e.g., a driver) for operating the network interface card. Communication between the computing device 100 and other devices may occur using any protocol or mechanism over any wired or wireless connection. In some examples, network component 124 is operable to communicate data over public, private, or hybrid (public and private) using a transfer protocol, between devices wirelessly using short range communication technologies (e.g., near-field communication (NFC), Bluetooth™ branded communications, or the like), or a combination thereof. Network component 124 communicates over wireless communication link 126 and/or a wired communication link 126a across network 130 to a cloud environment 128, such as the cloud-computing environment depicted in FIG. 10. Various different examples of communication links 126 and 126a include a wireless connection, a wired connection, and/or a dedicated link, and in some examples, at least a portion is routed through the Internet.

The network 130 may include any computer network or combination thereof. Examples of computer networks configurable to operate as network 130 include, without limitation, a wireless network; landline; cable line; digital subscriber line (DSL): fiber-optic line; cellular network (e.g., 3G, 4G, 5G, etc.); local area network (LAN); wide area network (WAN), metropolitan area network (MAN); or the like. The network 130 is not limited, however, to connections coupling separate computer units. Rather, the network 130 may also include subsystems that transfer data between servers or computing devices. For example, the network 130 may also include a point-to-point connection, the Internet, an Ethernet, an electrical bus, a neural network, or other internal system. Such networking architectures are well known and need not be discussed at depth herein.

Figure 2:
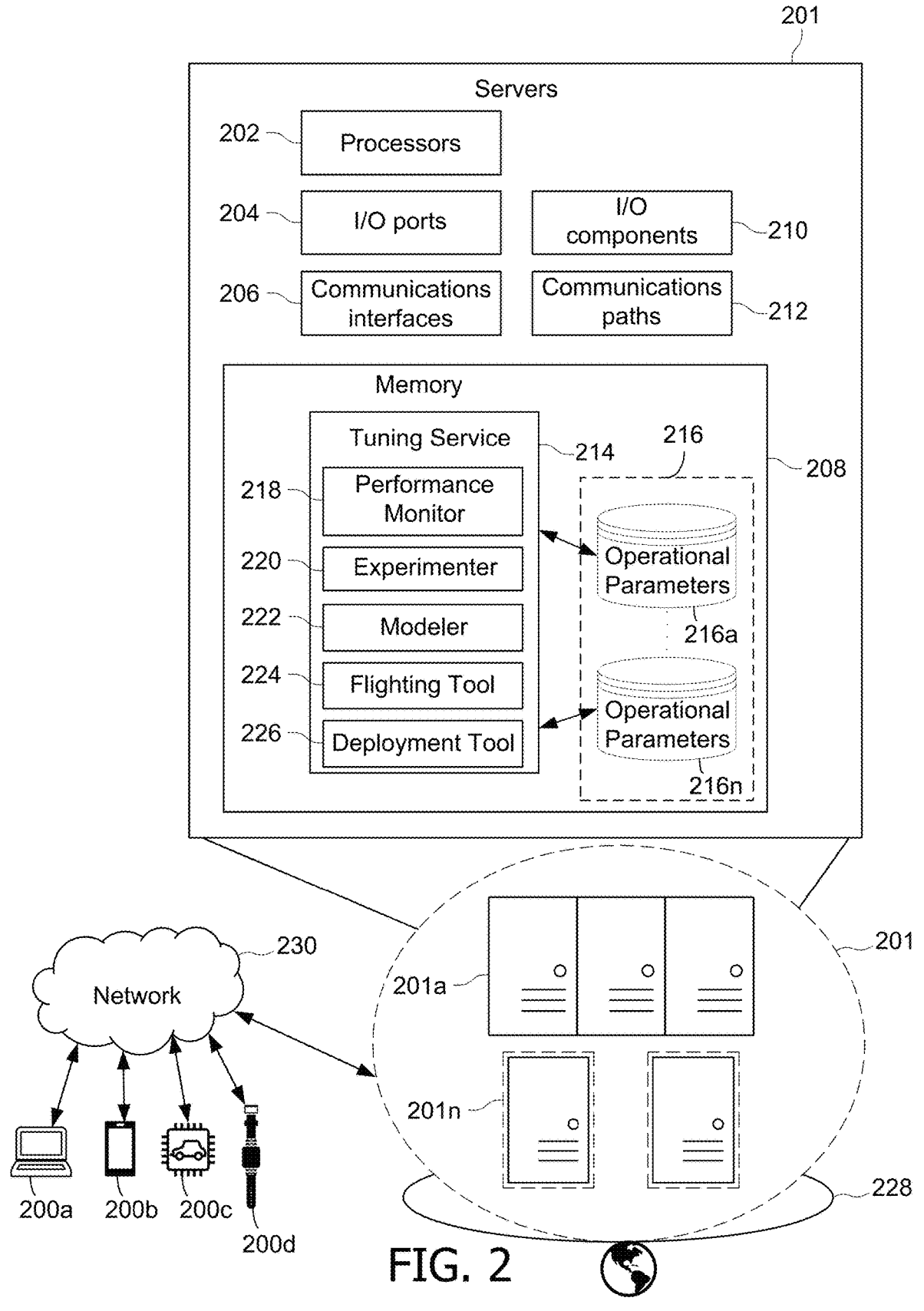
FIG. 2 illustrates a block diagram of machine-centric metrics to reflect job-level performance metrics and service-level objectives (SLO)

FIG. 2 illustrates a block diagram of a large-scale cloud environment 228 that is configured to be automatically tuned using the disclosed implementations. Numerous client computing devices 200*a-d* communicate with the cloud environment 228 over a network 230. In reference to FIG. 1, client computing devices 200*a-d* represent any number of computing devices 100, cloud environment 228 represents a cloud infrastructure similar to cloud environment 128 or 1000 (mentioned below in FIG. 10), and network 230 represents network 130.

The client computing devices 200*a-d* represent any type of client computing device 100 configured to access online resources (e.g., webpage, cloud-based application, or the like); run a deep learning (DL) job; migrate a private cloud database; or others. As depicted, the client computing devices 200*a-d* include a laptop 200*a*, a smartphone 200*b*, an Internet of Things (IoT) device 200*c*, and a wearable 200*d*. This is just a sample of different types of client computing devices 200, as a myriad others may access the cloud environment 228 for various reasons.

Cloud environment 228 includes various servers 201 that may be any type of server or remote computing device, either as a dedicated, relational, virtual, private, public, hybrid, or other cloud-based resource. As depicted, servers 201 include a mixture of physical servers 201*a* and virtual servers 201*n*, the latter of which are set up as VMs running inside of cloud environment 228. For the sake of clarity, these physical servers 201*a* and virtual servers 201*n* are collectively discussed as "servers 201," unless otherwise indicated. In some implementations and examples, the cloud environment 228 is operated as a large-scale cloud environment 128 (e.g., COSMOS developed by the MICROSOFT CORPORATION®), handling large amounts of data, such as an exabyte or more. Such implementations and examples may operate the various services 201 partially or wholly across the globe. In other words, the cloud environment 228

Like computing device 100 mentioned above, servers 201 include or have access to one or more processors 202, I/O ports 204, communications interfaces 206, computer-storage memory 208, I/O components 210, and a communications path 212. Server topologies and processing resources are generally well known to those in the art, and need not be discussed at length herein, other than to say that any server configuration may be used to execute the tuning service referenced herein.

Memory 208 represents a quantity of computer-storage memory and memory devices that store executable instructions and data for automatically tuning operational parameters of the cloud environment 228. Memory 208 stores executable instructions for a tuning service 214 and various operational parameters 216, either of which may be stored in disparate databases 216*a-n* across the various servers 201. The tuning service 214 and its depicted parts (218-222) may be implemented in software, firmware, hardware, or a combination thereof in various implementations and examples. In operation, the tuning service 214 is configured to automatically tune the operational parameters 216 of the cloud environment 228. In some implementations and examples, the tuning service 214 does so using a performance monitor 218, an experimenter 220, an artificial intelligence (AI) modeler 222, a flighting tool 224, and a deployment tool 226, as described in more detail below.

In operation, the performance monitor 218 monitors various performance metrics of the cloud environment 228, or clusters therein. These performance metrics may include any of the previously discussed telemetric data, processing measurements (e.g., CPU usage), throughput, job completion, or the like. Based on these performance metrics of the cloud environment 228, the modeler 222 creates different combinations of operational metrics 216 to use in tuning the cloud infrastructure 228, e.g., using the various techniques described below. Such modeling may be performed by a machine learning algorithm, an optimization algorithm, or through various statistical analytics that are run by the modeler 222.

The experimenter 220 runs the different combinations of operational parameters 216 that are generated by the modeler 222 on a test group of machines, or servers 201, in one or more clusters of the cloud environment 220. The experimenter 220 may also be configured to evaluate the performance of the test group of machines for the various combinations of operational parameters 216 that are modeled by the modeler 222. This largely becomes an optimization problem where the experimenter 220 identifies the most efficient combination of operational parameters 216 to use based on how well the test groups of machines function. This most efficient group of operational parameters 216 may then be pre-processed by the flighting tool 224 and deployed by the deployment tool 226 to the cloud environment 228. In other words, the cloud environment 228 is tuned with the modeled, tested, and optimized set of operational parameters 216.

Efficiency of the operational parameters 216 being tested may be dictated by the SLOs of an organization or a client, which may be specified in a service-level agreement (SLA). For example, if a particular customer has certain uptimes for a given application, the operational parameters 216 may be modeled based on such SLO criteria, and the experimenter 220 identifies which group of modeled operational parameters 216 produce such update (or SLO criteria) in the test group of servers 201. Numerous other SLO criteria may be considered.

Often, modeling all the individual components of a large-scale cloud infrastructure are intimidating as it involves a multitude of components, such as a scheduler, compiler, query optimizer, job manager, etc. Considering the fact that such a cloud infrastructure may be executing billions of tasks and millions of jobs that could interfere with each other as they may be executed on the same set of machines, modeling each one of them with significantly variant characteristics requires a large number of parameters and strong assumptions, which renders it infeasible. Therefore, abstraction and simplification are used. With only a handful number of tractable models, embodiments capture the complex dynamics of the cloud infrastructure accurately. To do so, telemetry-driven models are used that mimic the behavior of the cloud infrastructure based on observable telemetry metrics and emulated dynamics between them.

Figure 3:
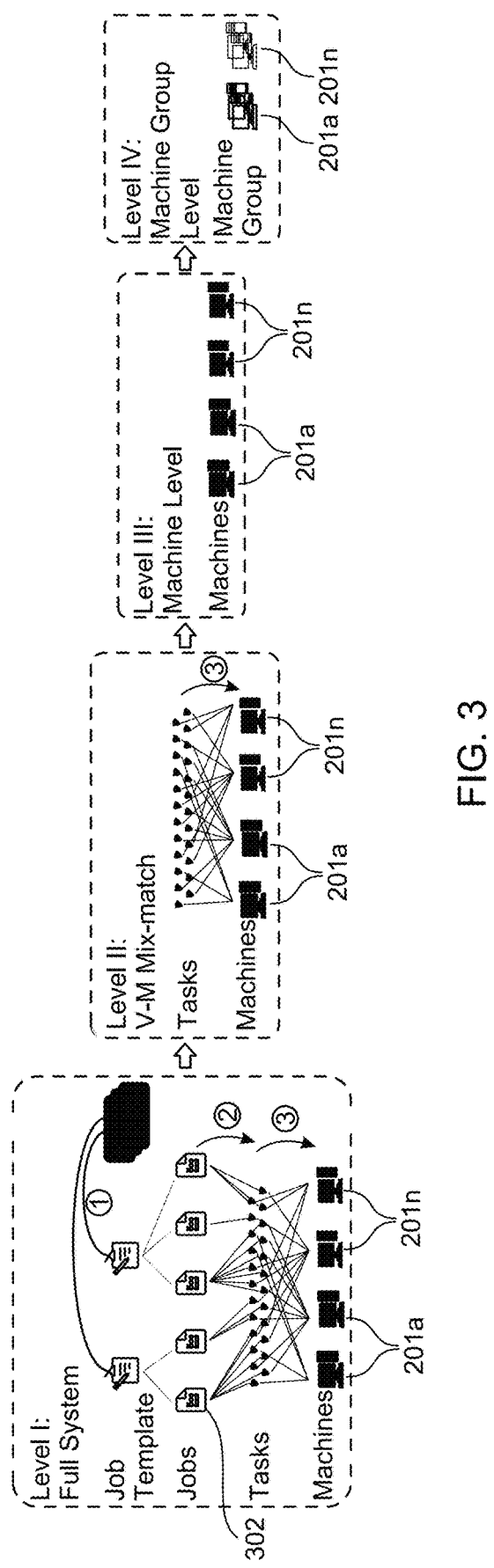
FIG. 3 illustrates a block diagram of a tuning service for a large-scale cloud infrastructure.

FIG. 3 illustrates a block diagram showing a tuning service that automatically tunes the cloud environment 228 through abstracting the cloud environment 228 to just groups of machines 300. This is shown in FIG. 2 by the Full System in Level I being abstracted to the physical servers 201*a* and VMs 201*n* of Level II, to the machine level of Level III, and finally to groups of machines in Level IV. Embodiments automatically tune the cloud operational parameters at the machine group level, instead of having to do so at the Full System level. For a large-scale cloud infrastructure, given the fact that there are only a handful number of machine groups with different software-hardware combinations, based on the needs of different projects, a small number of models per group are sufficient to mimic the full dynamics of the cloud infrastructure, which is tractable and easy to maintain.

In some embodiments, Service Level Objectives (SLOs) for job execution time are used for a small subset of the production pipelines that run. Given that jobs 302 are processed in hundreds, thousands, or more tasks spreading across the servers 201*a-n*, and the servers 201*a-n* are simultaneously executing multiple tasks belonging to various jobs 302 at a time, this many-to-many relationship and the complicated entangling create difficulties to separate the performance impact due to system-level changes or user/application-level changes, such as changes in workloads, resource allocation requested by users, etc. Serving a large number of users and workloads, significant variation of job-level characteristics were observed in the analyzed cloud environment 228 in terms of size and type of operators involved, with the prevalent usage of user defined operations, which lead to more difficulties in extracting a representative workload as the benchmark.

The job-level performance closely relates to task-level metrics. And if performance requirements at the task-level are being met, the job-level performance requirements can be automatically satisfied. For instance, during tuning, in order to maintain the same job-level performance, one may expect that, in general, the distribution for the task execution time will shift towards the lower end, indicating a general improvement for the task-level latency. But in other examples, the disclosed automatic tuning helps with the slower tasks that are more likely to be the straggler of the job 302. By improving the performance on the slower tasks, the job-level latency may be improved, ensuring that the current SLOs are met.

Metrics that naturally aggregate at the machine level (e.g., CPU usage) are tracked in some embodiments. Together with task-related metrics, those statistics reflect the latency that directly relates to SLOs, the throughput of the system, and the utilization efficiency of different resources, which is important from the operator's point of view and also directly relates to the tuning knobs of the cloud infrastructure. At this level, the performance and the controllable parameters may intercept.

In some implementations, a scheduler distributes tasks fairly, or evenly, across different servers 201*a-n*, and at the aggregate level, servers 201*a-n* are processing a similar combination of workloads. So measuring the performance of machines with different SKUs and software configurations, comparing machine-level performance metrics from different groups of machines is fair. Some implementations and examples use various performance metrics at the machine level or aggregated to the machine group level to examine the operation of the cloud infrastructure. The loss of information during the process may be further checked for validation. Some implementations track and focus on the following telemetric data (or metrics) jointly at the server 201*a-n* group level or examine their distributions across machines (servers):

| Name | Description | Focusing Aspects |
|---|---|---|
| Total Data Read | Total bytes read per hour per machine | Throughput rate |
| Number of Tasks | Total number of tasks finished per hour per machine | Throughput rate |
| Bytes per Second | Ratio of sum of the total data read and total execution time per machine | Throughput rate |
| Bytes per CPU Time | Ratio of sum of the total data read and total CPU time per machine | CPU processing rate |
| CPU Utilization | Time-average CPU utilization per hour in percentage | Utilization level |
| AverageRunning Containers | Time-average running containers per hour | Utilization level |

Based on this set of metrics, dynamics between the metrics across different groups of servers 201*a-n* are modeled using ML, which further enables the development of models to predict the performance when changing some of the system-level configurations. It was observed that configuration changes usually have direct impact on one or multiple sets of metrics, that further leads to chain effects on other metrics of interest. Those models are the innovative semantics derived to describe the fundamental characteristics of the cloud infrastructure when running at different workload levels and configuration settings. Built upon those models, an optimization module (code) or service is used to select the optimal configuration of cloud operational parameters.

Looking closer at FIG. 3, the cloud infrastructure may be abstracted multiple times (shown as Levels I-IV). Level I shows that jobs are submitted in a cloud infrastructure in accordance with an SLO. In some implementations and examples, the jobs are then instantiated (e.g., job templates populated) and job tasks are created that are scheduled for performance on a host of computing resources (machines) of the cloud infrastructure. Level II provides a layer of abstraction, showing that the job tasks may be assigned to a combination of physical and virtual machines (VMs)—the servers 201*a-n*. Level III provides another layer of abstraction to only the specific servers 201*a-n* that are being used. And Level IV abstracts that further to just the specific groups of machines: physical servers 201*a* and VMs 201*n*.

In some implementations, a task count and total data reads may be tracked by the tuning service 214 for different clusters. The variation across workloads at the machine level may be significant and hard to extract representative workloads. Task execution time distribution across different SKUs indicates that tasks executed on slower machines are more likely to be on the critical path of a job execution.

Figure 4:
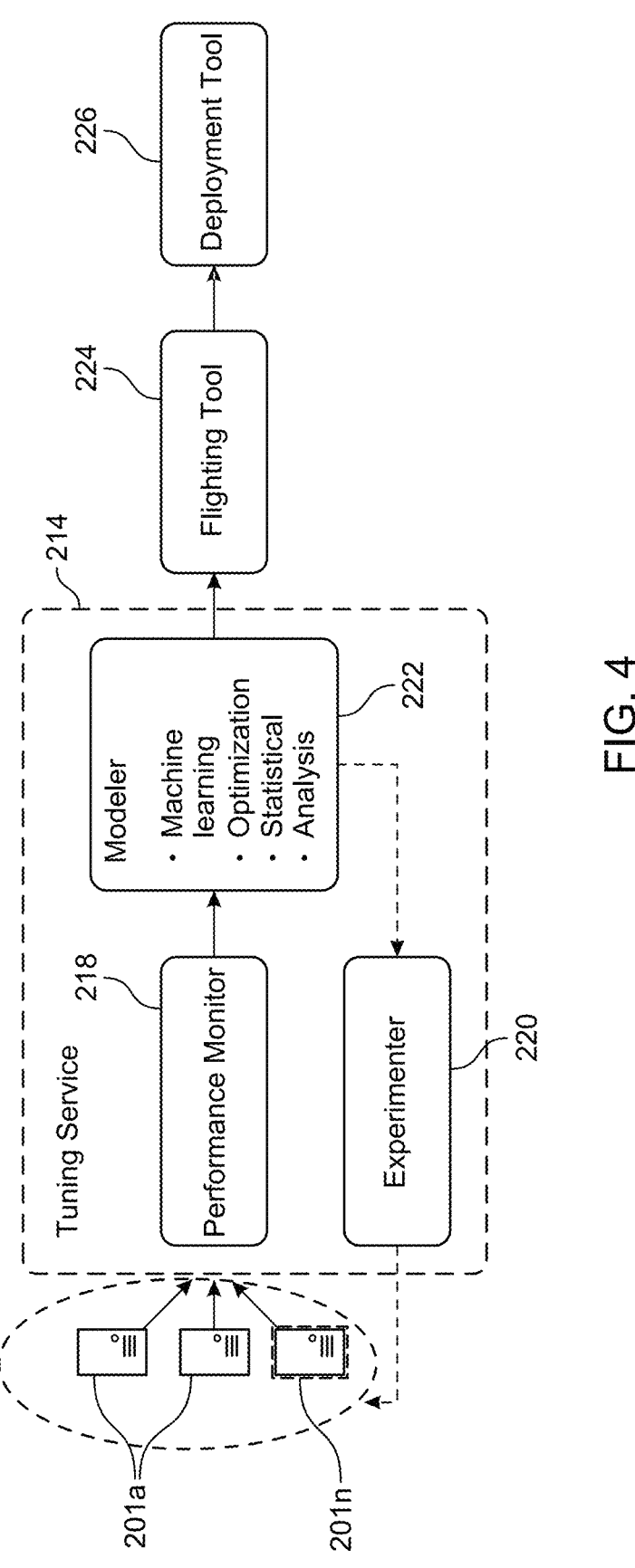
FIG. 4 illustrates a block diagram of component parts of a tuning service operating to automatically tune operational parameters of a cloud environment.

FIG. 4 illustrates a block diagram of the tuning service 214 for automatically tuning the operational parameters of the cloud environment 228. The illustrated embodiment shows the tuning service 214 in operation on the servers 201. In particular, three cloud services, the performance monitor 218, the experimenter 220, and the modeler 222 automate tuning in the cloud environment 228. A flighting tool 304 and a deployment tool 306 are used for deployment of the tuned operational parameters into the cloud environment 228. Each of the performance monitor 218, the experimenter 220, the modeler 222, and the flighting tool 304 may be implemented as executable instructions (code), a cloud service, firmware, or a combination thereof.

In operation, the performance monitor 218 joins the telemetry data from various sources and calculates performance metrics of interest, providing a fundamental building block for all the analysis. Some implementations deploy an end-to-end data orchestration pipeline to collect data on a daily basis. As previously discussed, the performance monitor 218 monitors various performance metrics of the cloud environment 228, or clusters therein. These performance metrics may include any of the previously discussed telemetric data, processing measurements (e.g., CPU usage), throughput, job completion, or the like. Based on these performance metrics of the cloud environment 228, the modeler 222 creates different combinations of operational metrics 216 to use in tuning the cloud infrastructure 228, e.g., using the various techniques described below. Such modeling may be performed by a machine learning algorithm, an optimization algorithm, or through various statistical analytics that are run by the modeler 222.

The experimenter 220 runs the different combinations of operational parameters 216 that are generated by the modeler 222 on a test group of machines, or servers 201, in one or more clusters of the cloud environment 220. The experimenter 220 may also be configured to evaluate the performance of the test group of machines for the various combinations of operational parameters 216 that are modeled by the modeler 222. The experimenter 220 identifies the most efficient combination of operational parameters 216 to use based on how well the test groups of machines function. This most efficient group of operational parameters 216 may then be pre-processed by the flighting tool 224 and deployed by the deployment tool 226 to the cloud environment 228. In other words, the cloud environment 228 is tuned with the modeled, tested, and optimized set of operational parameters 216.

Again, efficiency of the operational parameters 216 being tested may be dictated by the SLOs of an organization or a client. For example, if a particular customer has certain requirements for GPU usage, the operational parameters 216 may be modeled based on such SLO criteria, and the experimenter 220 identifies which group of modeled operational parameters 216 produce such update (or SLO criteria) in the test group of servers 201.

The modeler 222 generates and proposes the optimal configurations. Depending on applications, the modeling modules includes various ML, optimization, statistical analysis, and econometric models. The flighting tool facilitates the deployment of configuration changes to any machine in the production cluster. The flighting tool 304 may be used as a safety check before the full-cluster deployment and also to deploy experiments to collect evaluation data for the analysis. In some implementations, users may specify the machine names and the starting/ending time of each flighting through a UI of the flighting tool 224 and create new builds to deploy to the selected machines. The modeling module and flighting tool vary across different applications, as discussed in more detail below.

In some implementations and examples, the tuning service 214 generates and models various combinations of cloud operational parameters based on telemetry data collected from an existing cluster operation. The tuning service 214 uses machine learning to predict the resulting performance of a new configuration. Though, some configurations target the future cluster operation for planning purposes. Based on appropriate modeling, some implementations are configured to choose an optimal configuration and avoid experiments. However, some applications require additional exploration to actually deploy the new configuration and evaluate on the observed performance. Those usually involve changes that the tuning service 214 or the cloud environment 228 has not seen before, or when the modeling approach is inaccessible. Thus, the applications may be categorized into three modes and tuned using different strategies: observational tuning, hypothetical tuning, and experimental tuning. These three modes may be carried out by the modeler 222.

In observational tuning mode, the tuning service 214 operates to improve the current operation efficiency of an existing fleet of machines. For this type of application, embodiments assume that the telemetry data collected from the existing cluster is sufficient to make the prediction for the performance of a new configuration thus allowing an observational tuning approach to avoid experiments. The flighting tool 304 may then deploy the new configuration of operational parameters based on the modeling results and used as a pre-deployment safety check to validate the model prediction.

In hypothetical tuning mode, the tuning service 214 operates to support future planning of new fleets with appropriate modeling. In this case, the flighting tool 304 is not applicable because of the lack of a testing environment. Applications for this group focus on the modeling and forecasting for the future scenarios.

In experimental tuning mode, at the operational level, for this group of applications, the telemetry data is not sufficient for predicting the performance of a new configuration. Therefore, tuning service 214 uses flighting of an experiment to collect data and deploy new configurations and then using the data as input for the modeling and downstream analysis.

Four representative applications are presented that focus on significantly different aspects of the tuning service 214, the tuning of which is deployed in production and on track to produce substantial savings for operating the cloud environment 228: YARN Configuration Tuning, Machine Configuration Design, Power Capping, and Select Software Configurations (SSCs). Each is described in detail below.

For YARN Configuration Tuning, the workload across different groups of servers 201 in a cluster is re-balanced by tuning YARN configuration parameters. Specifically, implementations focus on the parameter of "max_num_running_containers" that is specified for each software-hardware combination. This parameter limits the maximum number of containers that can be executed simultaneously on a server 201. The parameter "max_*" is a commonly seen parameter in various configuration settings. And this experience is transferable.

For Machine Configuration Design, the configuration of operational parameters is designed without leaving one of the resources to be idle or to be the bottleneck of throughput. The most cost-efficient configuration tailored to current customer workloads is then selected.

For Power Capping, a new power provision limit is calculated. Originally, machines in cloud environments 228 were provisioned with a conservatively high power consumption limit, which, through years of observation, is not cost-effective. The bottleneck for fitting more machines in a rack or in a data center is provisioned power, not space. By capping the power utilization and provisioning less power per machine, implementations increase the number of machines per rack and per data center. This amortizes the fixed costs of the rack and data center across more machines, which accounts for a large portion of the cost.

For Selecting Software Configurations (SCs), servers 201 are purchased with different hardware (e.g., SKUs) and deployed with different versions of the software. In the cluster, there two software configurations (e.g., SC1 and SC2) exist, corresponding to different mapping of logical drives to physical media. Implementations decide between the two options based on related latency or throughput.

Moreover, for the YARN Configuration Tuning, implementations use the current observational data to predict the performance with different configurations, e.g., maximum number of running containers for different SC-SKU combinations. For Machine Configuration Design, implementations focus on future planning of the system, and can be solved by Hypothetical Tuning. For Power Capping and Selecting SCs, without actual deployment of the new configuration, it is very difficult to predict the resulting impact of power capping or with the new software configurations. Therefore, some embodiments use Experimental Tuning. The table below summarizes the four different tuning applications:

| Application | Application Group | Tuning Parameter |
|---|---|---|
| YARN-Config | Observational Tuning | Maximum running containers for each SC-SKU combination |
| SKU-Design | Hypothetical Tuning | Amount of RAM, SSD per machine |
| Power-Capping | Experimental Tuning | % below current provision level |
| Software-Configurations | Experimental Tuning | Binary choice between SC1 and SC2 |

An Observational Tuning approach was developed to tune the configurations by building the predictive models to avoid the need of rounds of cluster-wide experiments, which are required by black-box approaches, such as Bayesian optimization (BO) and reinforcement learning (RL). Cluster-wide experiments were found to be impractical in large-scale cloud infrastructures because of how slowly and carefully changes to production need to be made. By properly modeling the dynamics of the system, embodiments are able to predict the potential performance changes with different configurations.

In some implementations and examples, the Observational Tuning approach comprises two modules: (1) a prediction engine to predict the performance metrics given different configurations and (2) an Optimizer to select the optimal solution. Both are implemented as executable instructions (code), hardware, firmware, or a combination thereof.

The prediction engine predicts the resulting performance given a new set of configurations. Along these lines, two crucial observations are made. First, the change of a particular set of configuration parameters usually affects one (or a few) sets of metrics directly, and the impact is easy to measure. For instance, by changing the configuration for the maximum number of running containers, the metrics directly impacted are the actual running containers of a machine and its distribution. Reducing the maximum shifts its distribution towards the lower end.

Figure 5:
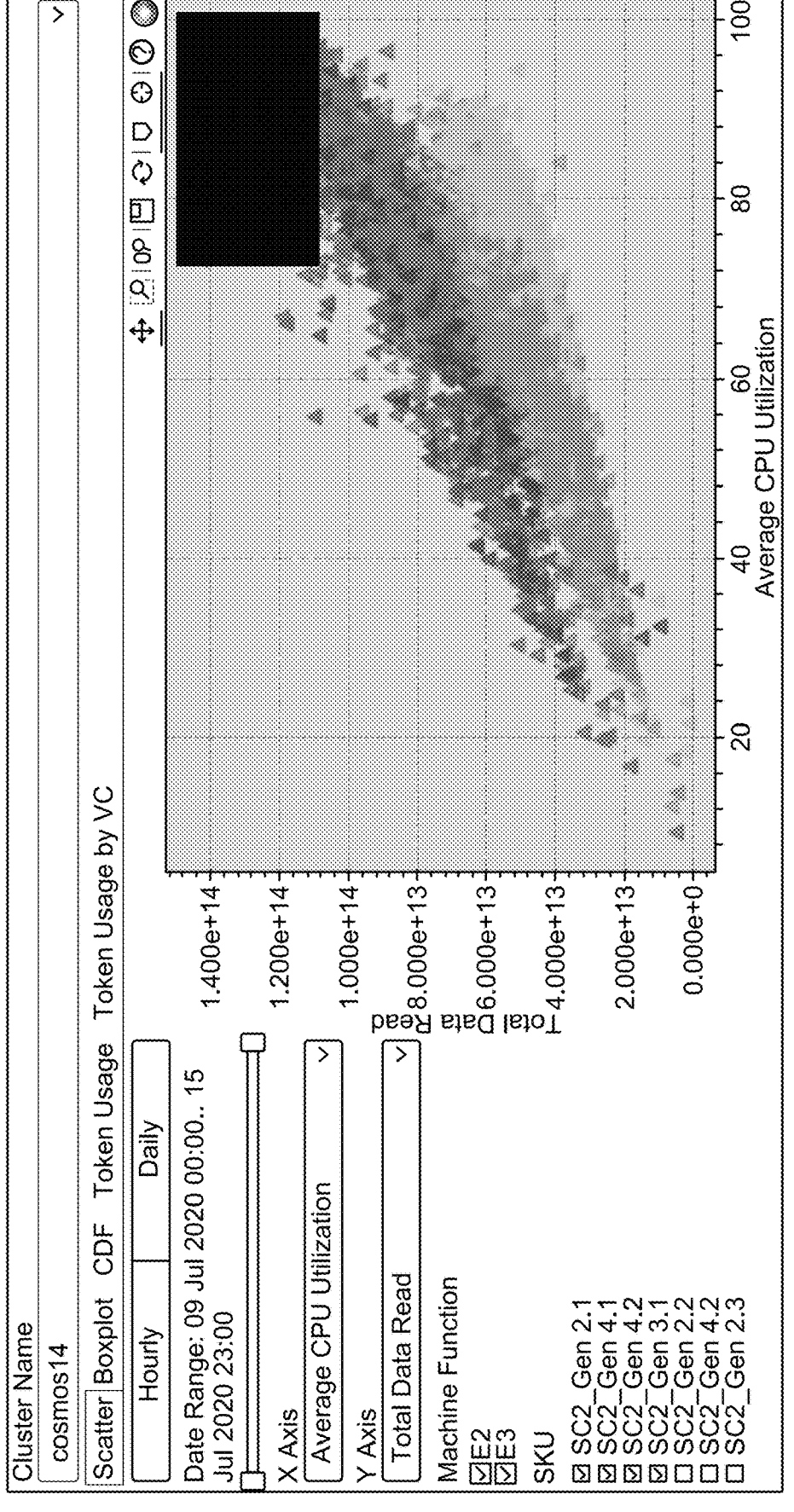
Figure 6A:
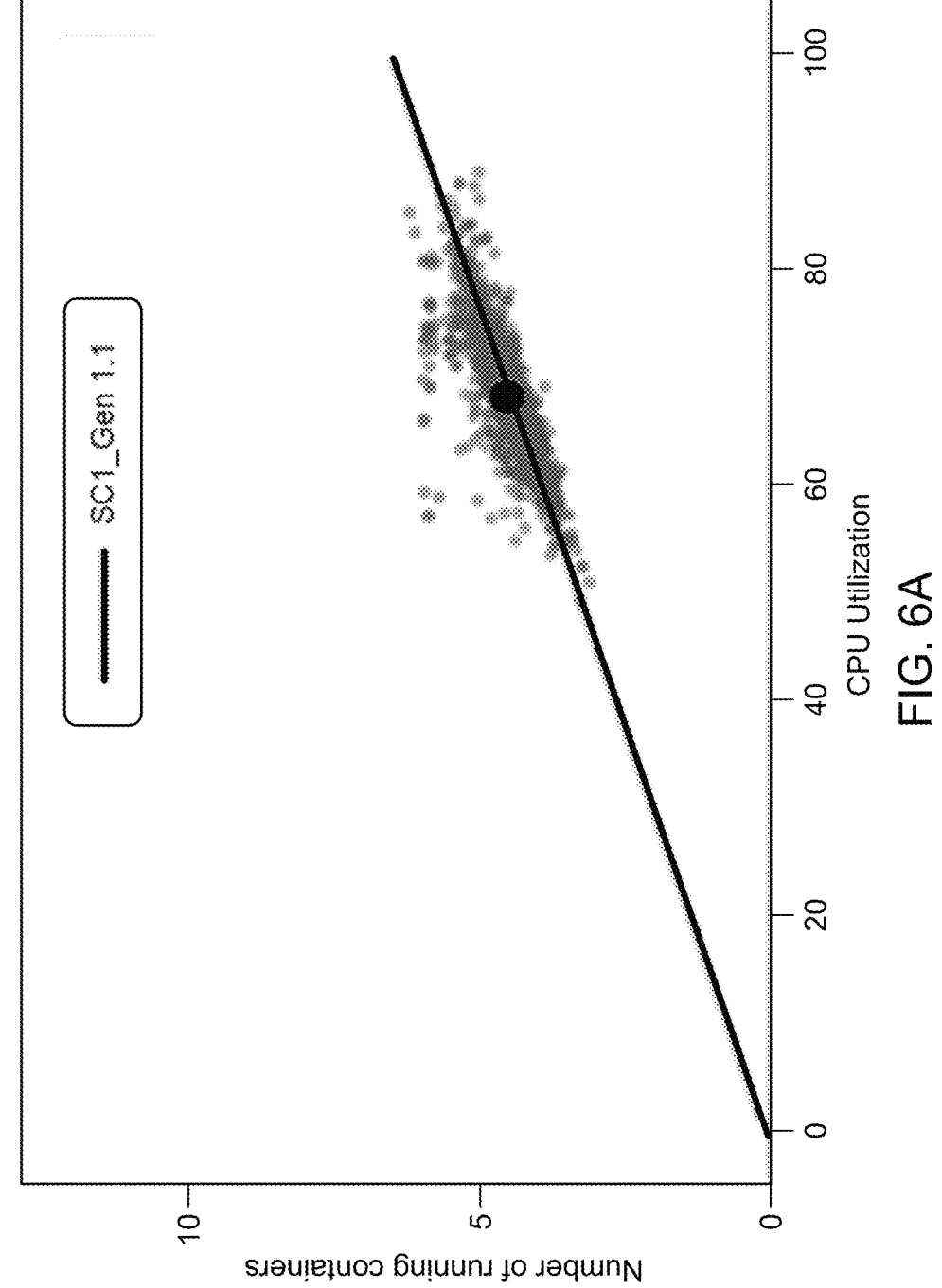
FIGS. 6A-6D illustrates graphs of set of calibrated ML models to depict the running containers and task execution time in seconds versus CPU utilization level.
Figure 6B:
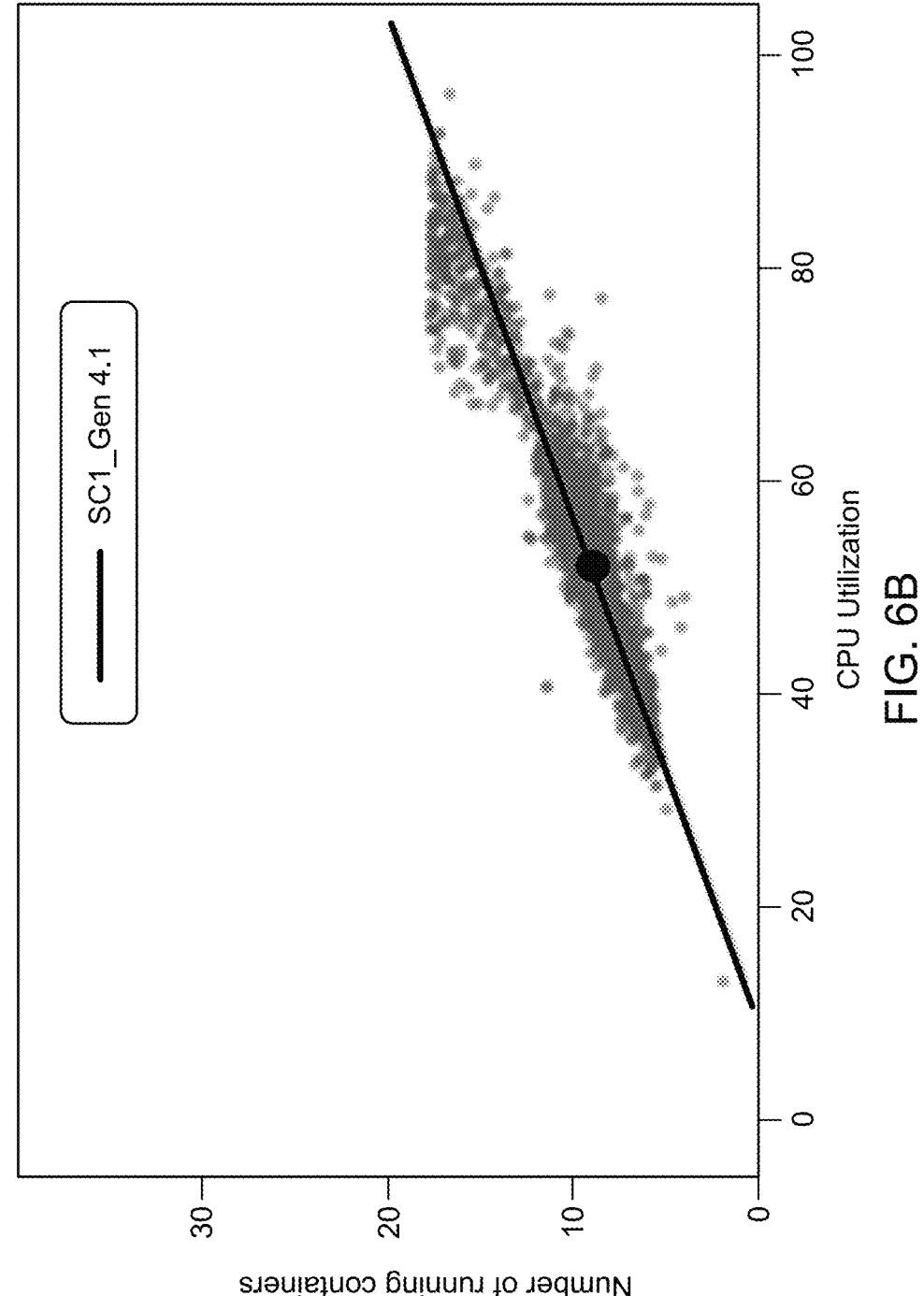
Figure 6C:
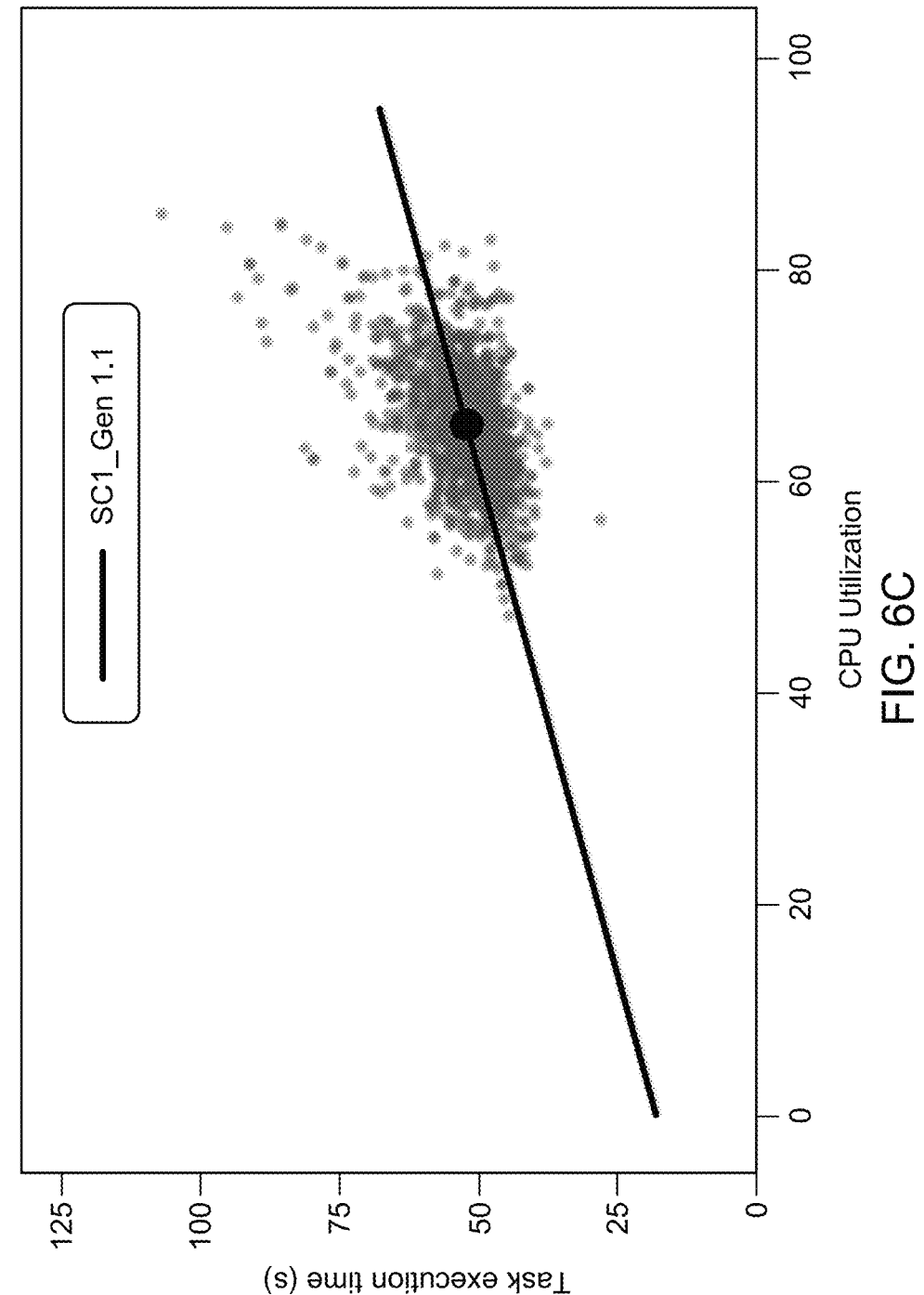
Figure 6D:
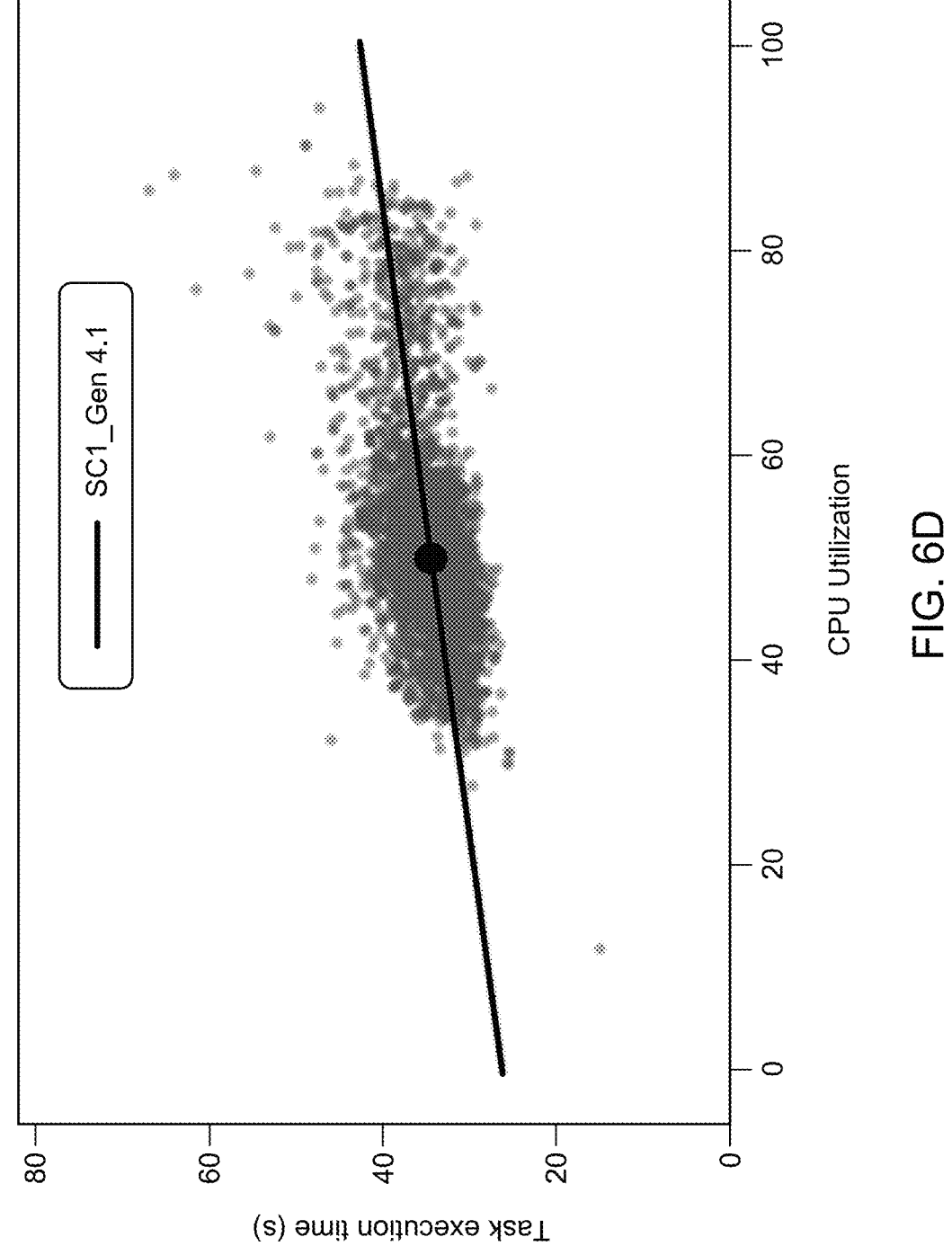

Second, the dynamics between different sets of parameters are captured and used to better understand how the change in one set of metrics affects the others using ML models (i.e., the chain effect). In the observational data, due to the natural variance of the system operation, a full-spectrum of ranges of the performance metrics are considered (e.g., in FIG. 5 where observations are shown of machines running with various levels of CPU utilization). Based on this variation, embodiments build models to mimic the dynamics between different sets of metrics and map one metric to another.

The above two observations are important building blocks to capture the relationship between changing configurations to the changes in the objective functions (or constraints) that embodiments hope to optimize. To do so, some implementations configured to perform the following operations: (1) based on the set of parameters being tuned, identify the set(s) of metrics that will be directly impacted; (2) create (or build) ML models to understand how this set of metrics affects the others, especially the ones that relate to our objective functions/constraints; and (3) based on the resulting formulation, perform optimization to pick the optimal configuration.

For the development of the ML models, the dynamics between the different sets of operational parameters 216 remain the same, even with different operational parameters 216. Those aspects reflect the mechanics of the infrastructure, and capturing those relationships becomes key for modeling and prediction. For instance, in FIG. 5, even with different levels of CPU utilization or the workload levels, the relationship between the resulting throughput and the CPU utilization level may be expressed with the same formulation for each group of servers 201 with a particular software/hardware combination. This relationship is not affected by the external configuration, such as YARN configuration settings. Such fundamentals are used to predict the resulting performance under new configurations to avoid the need for experiments.

Based on observational data, sets of ML models are built by the modeler 222, such as $g_k(\bullet)$, $h_k(\bullet)$ and $f_k(\bullet)$, for each SC (software configuration) and SKU (hardware) combination k, to capture the relationship between the different sets of metrics, such as (1) the number of running containers versus the CPU utilization level; (2) the CPU utilization level versus the number of tasks finished; and/or (3) the CPU utilization level versus the task latency respectively, using the following Equations (1)-(6):

$$x_k = g_k(m_k) \forall_k = 1,2,3, \ldots ,K \tag{1}$$

$$x'_k = g_k(m'_k) \forall_k = 1,2,3, \ldots ,K, \tag{2}$$

$$l_k = h_k(x_k) \forall_k = 1,2,3, \ldots ,K, \tag{3}$$

$$l'_k = h_k(x'_k) \forall_k = 1,2,3, \ldots ,K, \tag{4}$$

$$w_k = f_k(x_k) \forall_k = 1,2,3, \ldots ,K, \tag{5}$$

$$w'_k = f_k(x'_k) \forall_k = 1,2,3, \ldots ,K, \tag{6}$$

where, k: the index for the SC-SKU combination, k=1, 2, 3, . . . , K;

$m_k$: the number of running containers (simultaneously) per machine with SC-SKU combination k;

$m'_k$: the original number of running containers per machine with SC-SKU combination k;

$x_k$ and $x'_k$: the CPU utilization level for machines with SCSKU combination k, given the number of running containers $m_k$ and $m'_k$ respectively;

$l_k$ and $l'_k$: the number of vertices finished on a machine with SC-SKU combination k, given the CPU utilization level $x_k$ and $x'_k$ respectively; and $w_k$ and $W'_k$: the average vertex latency for machines with SC-SKU combination k, given CPU utilization level $x_k$ and $X'_k$ respectively.

In some implementations, these mappings between sets of performance metrics remain the same as in Equations (1)-(6) regardless of configuration changes, different utilization levels $x_k$ or $x'_k$, or running different amounts of workloads (measured by number of running containers $m_k$ or $m'_k$). In other implementations, the modeler 222 uses different ML models that involve a larger set of metrics of interest, such as the resource utilization of SSD, network bandwidth, or the like. In still other implementations the modeler 222 uses regression models as the predictors, such as linear regression (LR), support vector machines (SVM), or deep neural nets (DNN). The modeler 222 may be run different objective functions and constraints with respect to the goals of a given application and corresponding ML models with respect to the directly impacted performance metrics, and the ones related to the objective functions/constraints are used.

For the application of tuning the maximum running containers in YARN, embodiments maximize the total number of running containers subject to the same overall average task latency at the cluster level as the current situation. Therefore, the directly impacted performance metric is the number of running containers on the machine. Embodiments maintain the same level of task latency (cluster-wide average) as the constraint. Optimization may then be performed with a closed-form objective function according to the following:

$$\max_{m_k, k=1,2,3,\dots,K} \sum_{k=1,2,3,\dots,K} m_k n_k, \tag{7}$$

$$\text{s.t. } \overline{W} \le \overline{W}', \tag{8}$$

$$\overline{W} = \frac{\sum_{k} w_k l_k n_k}{\sum_{k} l_k n_k}, \tag{9}$$

$$\overline{W}' = \frac{\sum_{k} w_k' l_k' n_k}{\sum_{k} l_k' n_k}, \tag{10}$$

$$(1) - (6).$$

where, $n_k$: the number of machines in the cluster for machine function-SKU combination k.

$\overline{W}$ and $\overline{W}'$: the overall average task latency for the full cluster, given CPU utilization level $x_k$ and $x'_k$ respectively, calculated as the weighted average of task latency running on different groups of machines.

The optimal solution of the optimization ($m^* \forall_k = 1, 2, 3, \dots, K$) indicates the optimal workload distribution across different groups of machines. Based on the changes of the workload distribution, embodiments modify the configuration for the maximum running containers accordingly, increasing or decreasing it for different software-hardware (SC-SKU) combinations.

The tasks running on slower servers 201 are more likely to slow down a job. Re-balancing of the workloads suggested by the modeler 222 reduces the workload skew and shifts traffic from slower machines to faster servers 201 to improve the overall efficiency. With the increased utilization level on faster machines, mild performance degradation may be experienced; however, those are less likely to be on the critical path of a job (a set of slowest tasks for each stage of the execution) that directly impact the job-level latency. Therefore, even though the constraint for the optimization formulation ensures the same average task-level latency, the automated tuning improves the performance of the straggler tasks and is very likely to improve the job-level latency by reducing the variation of task-level latency.

FIGS. 6A-6D show a set of calibrated ML models to depict the running containers and task execution time in seconds versus CPU utilization level. Each small dot corresponds to an observation aggregated at the daily level for a machine. The line shows the model estimation. The large dot in the center of the figure indicates the median level of the variables across all observations. These FIGS. 6A-6D show the optimization results in terms of the suggested shift of current workloads (calculated as the number of containers running per machine). For slower machines, the ML models generated by the modeler 222 suggest to decrease the utilization by reducing the number of running containers, while for faster machines, the model suggests to increase it. The same optimization model was run focusing on a higher percentile of CPU utilization level, corresponding to the situation where the whole cluster is running with heavy workloads. The suggested configuration change is the same in terms of the direction for the gradients.

The flighting tool 224 is an important component of the disclosed tuning service 214. Before fully deploying to a production cluster, several rounds of flighting were performed that validated the possibility of increasing maximum running containers for different SKUs to increase utilization. The first pilot flighting was on 40 Gen 1.1 machines to confirm that if reducing the max_num_running_containers in the YARN configuration file is affecting the real observed maximum number of running containers. The second piloting flighting experiment was on Gen 4.1 machines to confirm that if increasing the max_num_running_containers in the YARN configuration is effective and allows the machines to run more workloads. The third piloting experiment was on two sub-clusters of machines (each with around 1700 machines) to validate if the updated configuration changes the workload distribution. The fourth pilot flighting was for three sub-clusters of machines and validated the benefits of tuning, i.e. adding more containers to the sub-cluster with better performance.

The production roll-out process was quite conservative where the operational parameters 216 of the configuration were only adjusted by a small margin, e.g., decrease or increase the maximum running containers for each group of machines by one. Performance data for the periods of one month before and one month after the roll-out were extracted, where the maximum running containers is increased/decreased by one unit. In the production environment, the configuration was changed conservatively to avoid any possible large-scale performance impact. Treatment effects were used to evaluate the performance changes during the two periods with significant tests. It was observed that the level of latency (measured by average task latency), the throughput (measured by Total Data Read) was improved by 9%. For this round of deployment, conservatively, a 2% sellable capacity from the cluster was gained (measured by the total number of containers with the same level of latency as before) by only modifying the maximum running containers for each SKU-SC by one.

The Prediction Engine may be extended to other performance metrics of interest. For the tuning of other parameters, one identifies the most relevant sets of operational parameters 216 and starts tracking the dynamics between them by developing the set of predictive ML models. The Optimizer may be formulated with various objective functions for the different tuning tasks.

In some implementations, low priority containers are queued on each machine. The queuing length and latency vary significantly for machines with different SKUs and SCs. This is because of the same setting of maximum queuing length for all SKUs. As faster machines have faster de-queue rates, embodiments are able to allow more containers to be queued on them. In this sense, similar tuning methodologies may be used to learn the relationship between the tuned parameters (e.g., the maximum queuing length) and the objective performance metrics (e.g., variance of queuing latency) to achieve better queuing distribution.

In this application, the resource utilization metrics of the machines (as opposed to the throughput, latency, etc.) influence decisions around what hardware components to purchase in future machines. As discussed above, the dynamics between different sets of performance metrics may be quantitatively measured, such as the utilization level of different hardware resources like SSD, RAM, or CPU. Once CPU to use for the next generation servers is determined, the configuration design problem reduces to a prediction problem for estimating the utilization of SSD and RAM given the number of CPU cores. The resource utilization pattern is the same as the current fleet as it reflects the characteristics of the workloads (CPU intensive versus memory intensive). Therefore, the predictive models capture the relationship between the number of cores used versus the amount of SSD and RAM used in the observational data and project the SSD and RAM usage as a function of the number of cores on the server, as expressed in the following equations:

$$s=p(c)=\alpha_s+\beta_s c, \tag{11}$$

$$r=q(c)=\alpha_r+\beta_r c, \tag{12}$$

where, c: number of CPU cores used.
s: amount of SSD used when using c CPU cores.
$\alpha_s$, $\beta_s$: parameters to predict the SSD usage.
r: amount of RAM used when using c CPU cores.
$\alpha_r$, $\beta_r$: parameters to predict the RAM usage.

In Equations (11) and (12), for p(c) and q(c), a simple linear regression model was used. Based on current data, the values $\alpha_r$, $\alpha_s$, $\beta_r$ and $\beta_s$ are calibrated.

Figure 7:
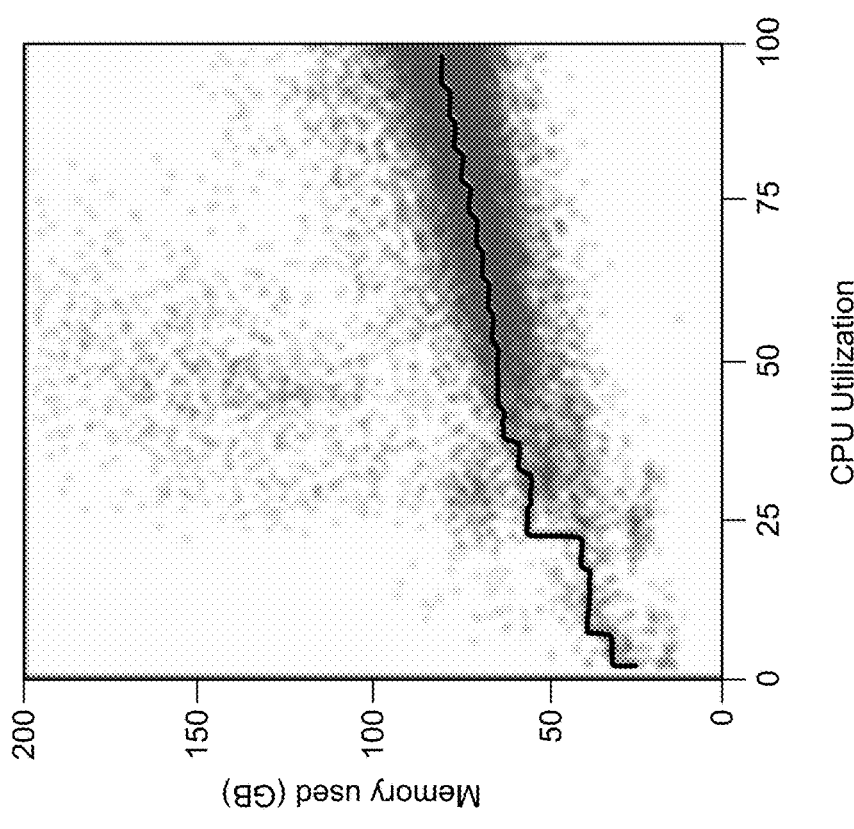
FIG. 7 illustrates a graph of current resource utilization of solid-state drives (SSDs) and random-access memory (RAM) with respect to different levels of CPU utilization for a particular SKU running with the production workload.
Figure 7:
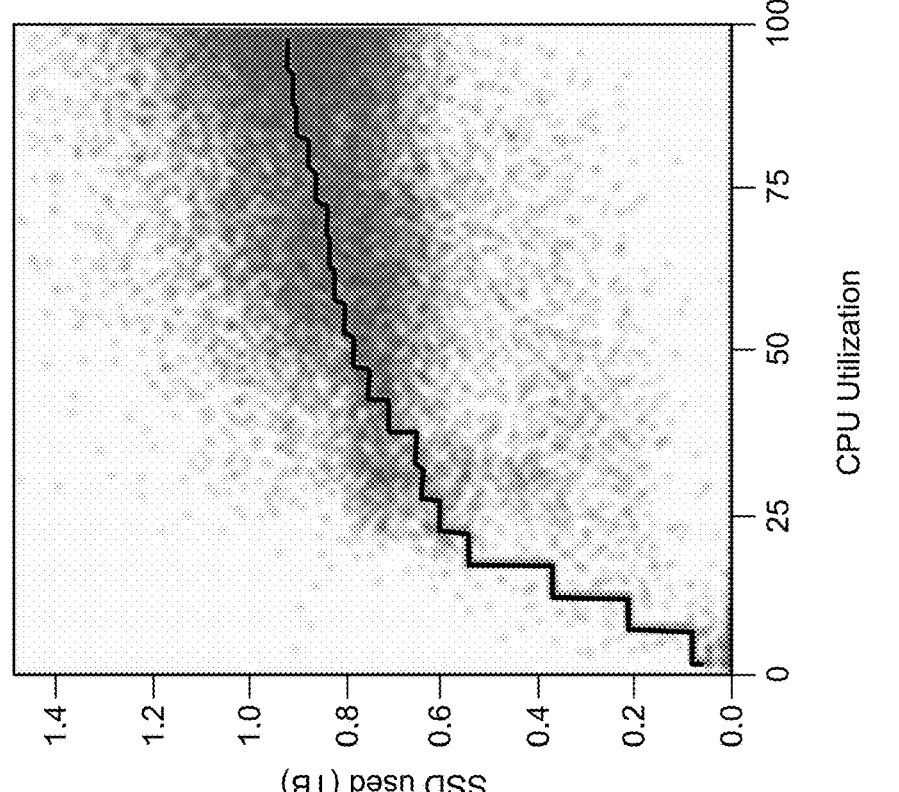

FIG. 7 shows the current resource utilization for SSD and RAM with respect to different levels of CPU utilization for a particular SKU running with the production workload. The observation is for each second for a full day with around 10.4 million records. The $\alpha_s$ and $\alpha_r$ are the intercepts of the projection, indicating the SSD and RAM usage levels when running with 0 cores. The $\beta_s$ and $\beta_r$ indicate the SSD usage per core and RAM usage per core. A full distribution with regard to the $\alpha_s$, $\alpha_r$, $\beta_s$ and $\beta_r$ can be derived based on each observation to capture the nature variances and noises.

For the optimization, the objective is to determine the most cost-efficient size of SSD and RAM for the new machines that have 128 CPU cores. Instead of having a closed form as Equation 7, a Monte-Carlo simulation is used to estimate the objective function—the expected total cost of each configuration. It was assumed that the maximum number of running containers on a machine are stranded by any of the three resources (CPU cores, SSD, and RAM). In some implementations, the cost of each configuration with different SSD and RAM sizes includes the penalty of idle CPU cores, SSD and RAM based on the unit cost of each resource and the extra penalty of running out of SSD or RAM. Running out of CPU is handled more gracefully than running out of RAM or SSD.

For a design with S SSD and R RAM, let $\alpha_s$ and $\alpha_r$ be the calibrated baseline usage for SSD and RAM respectively, the corresponding objective function may be estimated in the following manner. Initially, random numbers $\beta_s$ and $\beta_r$ are drawn from the observational data. The maximum number of CPU cores that can be used, c, are calculated in the following manner: c=min{128, p$^{-1}$(S), q$^{-1}$(R)}. Then, the quantity of the idle resources are estimated. In some implementations and examples, the number of idle CPU cores is: $I_c$=128−c; the amount of idle SSD is: $I_s$=S−p(c); and the amount of idle RAM is: $I_r$=R−q(c). The total cost based on the unit price may then be calculated. If there is no idle SSD (RAM), the machine is stranded by SSD (RAM), adding an extra penalty for running out of SSD (RAM).

Figure 8:
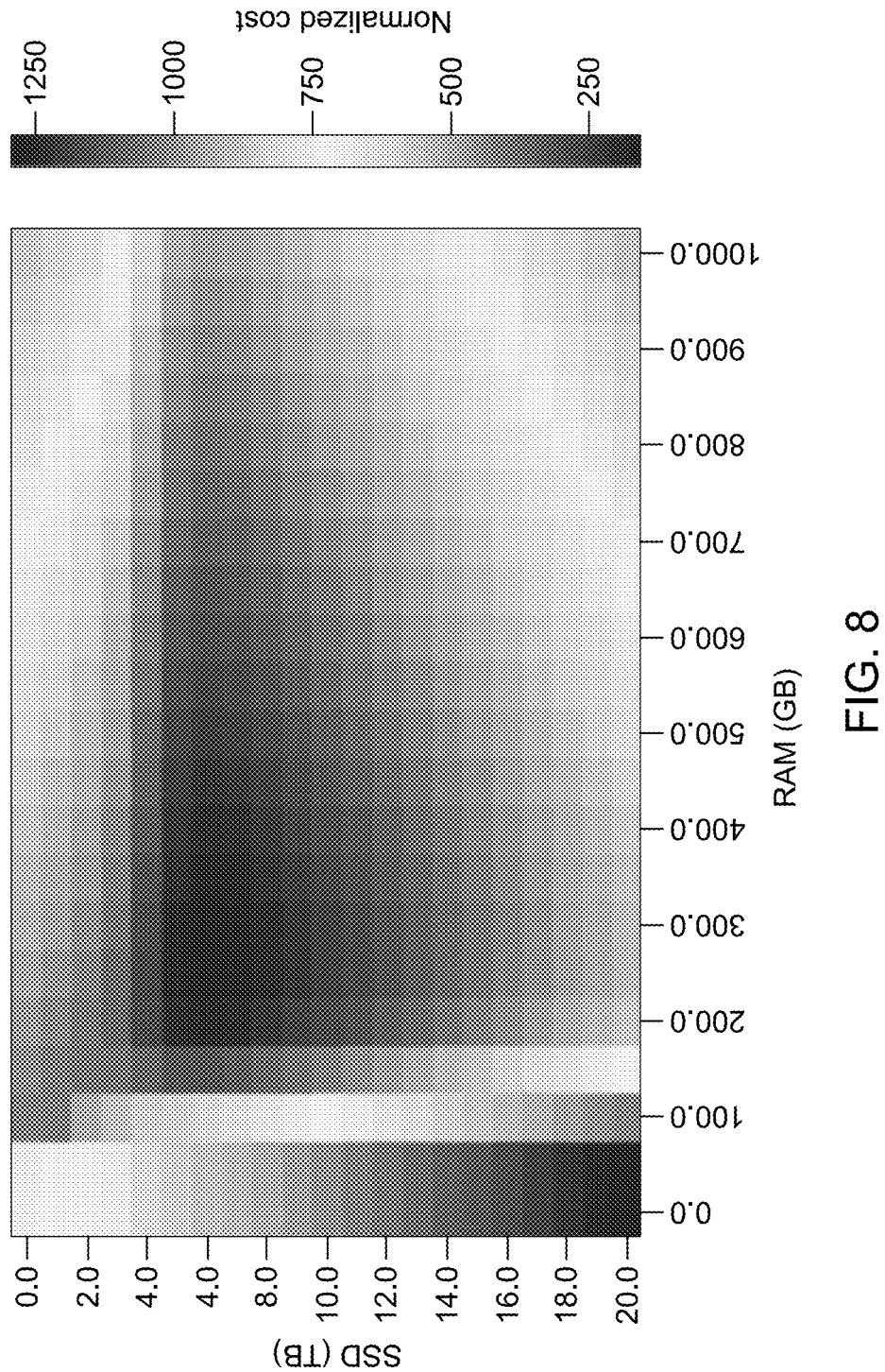
FIG. 8 illustrates a graph of an expected cost with respect to different configurations.

By repeating the above process (e.g., 1000 times), the expected cost for each design configuration is estimated with different amounts of SSD and RAM. If the configuration is designed with insufficient SSD or RAM, the out-of-SSD or out-of-memory penalty dominates the cost. If the configuration is designed with too much SSD or RAM, the penalty of having idle resources increases. This expected cost with respect to different configurations is shown in FIG. 8. The Optimizer is looking for an optimal spot where the expected penalty based on the distribution of RAM and SSD usage per core is minimized. This is shown in FIG. 8 in the top left corner of the graph, around 6.0 TB, 250.0 GB.

The same methodology of Observational Tuning and Experimental Tuning is also applicable for different resources utilization, such as network bandwidth, and many other performance metrics. The Optimizer can take either a closed-form formulation and use solvers to obtain the optimal solution, or use simple heuristics. In either case, given a predictor of the resulting performance (instead of building a complicated simulation platform), one can avoid the need for experiments to deploy new configurations in the production cluster. The set of machine learning models precisely captures the system dynamics in the complex production environment, tailored to the customer workloads.

Although Observational Tuning and Hypothetical Tuning cover a large number of applications, the performance impact for some configuration changes, such as changing a software configuration that affects the input/output (I/O) speed or the introduction of a new feature to improve the processor performance, is still unpredictable. In this case, Experimental Tuning is used. With the introduction of machine-level metrics, experiments may be done by deploying experiments to groups of machines in production and conducting A/B testing at a smaller scale.

Different applications require experiments to deploy the configuration changes to a group of machines using the flighting tool where in Phase II, the statistical analysis is used (see FIG. 4). For those configuration parameters, the tuning process involves: (1) experiments, and (2) evaluation. Based on the performance metrics discussed above, the optimal configuration may be picked.

For a group of applications, the key is the design of the experiments and the determination of performance metrics. To have a fair comparison between the different groups of machines with different configurations, variables that can potentially affect the performance to the best effort are controlled, such as the hardware configurations, the time frame of data collection, even the physical location of the machines. To have statistical significance, a relatively large sample size is used. To this end, three possible experiment settings are used: ideal setting, time-variant setting, and hybrid setting.

The ideal experiment setting is to have both the experiment group and control group from the same physical location, for example, choosing every other machine in the same rack as the control/experiment group. In this case, half of the machines are shown with the old configuration and half with the new one in the same physic location. This setting is ideal as it ensures that the two groups of machines are receiving almost identical workloads throughout the experiment, and as they are physically located close to each other, they are often purchased at the same time, and storing data for similar customers.

The time-variant setting is in general popular in A/B testing. For the same group of machines, this setting deploys consecutively the new and old configurations back-and-forth with a particular frequency, such as every five hours (instead of 24 hours to avoid time of day effects). The evaluation of different configurations is done by measuring the performance during different time intervals. However, this setting, even though it is popular in industry, has several limitations. In the production cluster, it is very difficult to frequently deploy new configurations in a short time frame, and will potentially have variance in workloads during the different time intervals, therefore the selection of re-deployment interval becomes tricky.

While both ideal and time-variant settings may not be feasible, the hybrid setting may be used that will collect performance metrics for different groups of machines with different configurations. In this sense, the aim is to ensure that the groups of machines are as similar as possible and conduct the experiment for a relatively long time period. With respect to the workload variation, one uses performance metrics that are less sensitive to the workload level.

Next, two applications are discussed: selecting software configurations and power capping.

Embodiments achieve the ideal setting through selecting two rows (with approximately X number of machines each) and choosing every other machine in the same rack as the control/experiment group. Two different software configurations are compared that represent using either SSD or HDD for the D: logical drive. SC1 puts D: drive on HDD, and SC2 puts D: drive on SSD. The creation of the SC2 design was motivated by high D: drive write latency for SC1 caused by contention for I/O on the HDD. This write latency created a bottleneck for resource localization in the tested cloud infrastructure.

The experiment was scheduled to run over five consecutive workdays. The following table shows the performance impact using metrics that directly reflect the latency and throughput of the system:

| Name | SC1 SC2 | % Changes | t-value |
|---|---|---|---|
| Total Data Read (PB) | 1.38 1.53 | 10.9% | 40.4 |
| Average Task Execution Time (s) | 24.1 22.9 | −5.2% | 27.1 |

The Total Data Read per day increased by 10.9% while the average task latency decreased by 5.2%, which is a very significant improvement. In all aspects of the performance of interest, the SC2 machines dominate and the result for Student's t-test shows that the changes are all significant.

Compared to the experiment in the previous section, in this application, the power capping is at a higher level of control infrastructure and all machines in the same chassis will be capped at the same level. Moreover, multiple rounds of experiment were performed to test the performance at different capping levels, the data will be collected for different time periods. The hybrid setting was used in this application and focused on the normalized metrics, such as the Bytes per CPU Time (ratio of the Total Data Read and the CPU time) and Bytes per Second (ratio of the Total Data Read and the task execution time), that are less sensitive to the workload level and examine the differences between the experiment group(s) and the control group in different time periods.

The experiment capped the machines to different provision levels and evaluated their performance. The performance impact was evaluated for machines with a new feature at the processor level enabled. For each round of the experiments with a particular level of capping, data was collected for four groups of machines for each SKU tested during the same time period to ensure that those groups of machines are receiving similar levels of workloads (but not necessarily identical as in the previous section):

Group A with no capping and Feature off,
Group B with no capping and Feature on,
Group C with capping and Feature off, and
Group D with capping and Feature on.

Over 120 machines were selected for each group and capped at 10%, 15%, 20%, 25% and 30% below the original power provision level, respectively. Each round of experiments ran for more than 24 hours.

Figure 9:
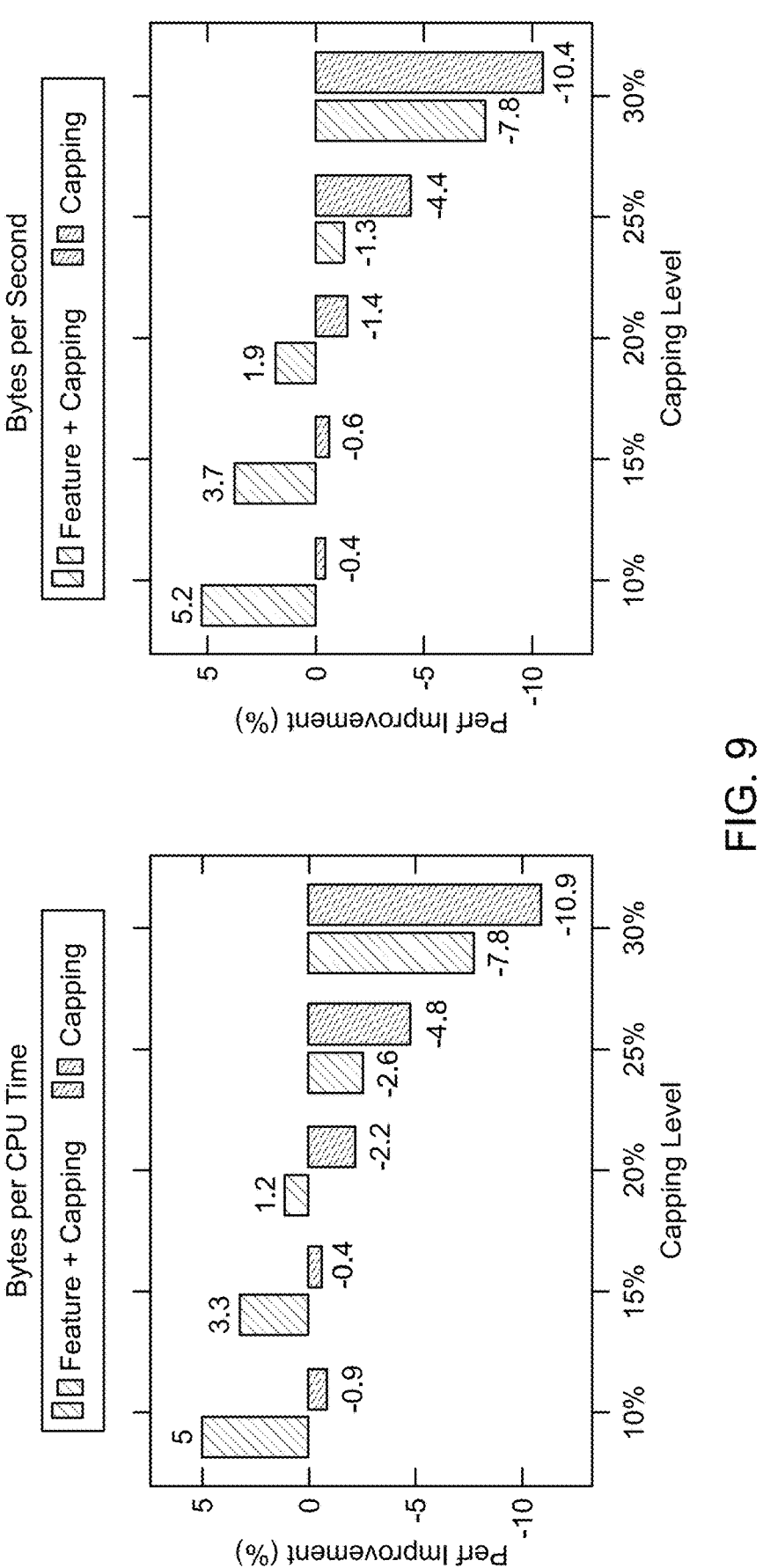
FIG. 9 illustrates a graph showing the performance impact experienced in a cloud infrastructure from two metrics due to different power capping limits for machines with a particular SKU both with and without certain features enabled.

FIG. 9 shows the performance impact on the two metrics due to different power capping limits for machines with a particular SKU with/without the feature enabled. The y-axis indicates the performance change benchmarked to the baseline, i.e. Group A with no capping and Feature off. With 10% capping, with Feature enabled (blue bars), for Bytes per CPU Time, the performance improved by 5%. While without Feature enabled (orange bars), the same capping results in the performance degrading by 1%. One can see that with the increasing power capping level, the impact of capping becomes more significant. In all cases, having Feature enabled improves the performance.

Similar experiments were also conducted for other SKUs in different clusters to determine the optimal power provision limit. Eventually, a relatively conservative capping level was chosen. However, it is still much lower than the original level and leads to considerable power reduction per year that may be harvested to add more machines in a cloud infrastructure.

For applications belonging to this category (Experimental Tuning), it is critical to properly design the experiment and choose from the different settings. This analysis is feasible because of the introduction of machine-level metrics that reflect the performance of the machines when running with a large amount of production traffic. It is impossible to isolate the impacts of configuration changes in the job-level metrics. Each job runs on hundreds or thousands of machines, and each machine executes tasks from all different jobs. One cannot control for each job to be executed only in the experiment group or the control group. On the other hand, by evaluating the performance metrics at the machine group level, the disclosed embodiments circumvent the need for extracting representative workload traces in the production environment. Data is collected for a relatively long time period to ensure that the machines received a sufficiently large amount of work and the performance is relatively stable for the evaluation of statistical tests.

The tuning service disclosed herein may be used to evaluate many other features of the system and has become a standardized pipeline that leads to significant performance improvement with minimum extra effort needed. The disclosed embodiments make up an end-to-end tuning application service configured for tuning framework at the cluster level at scale.

Example Cloud-Computing Environment

Figure 10:
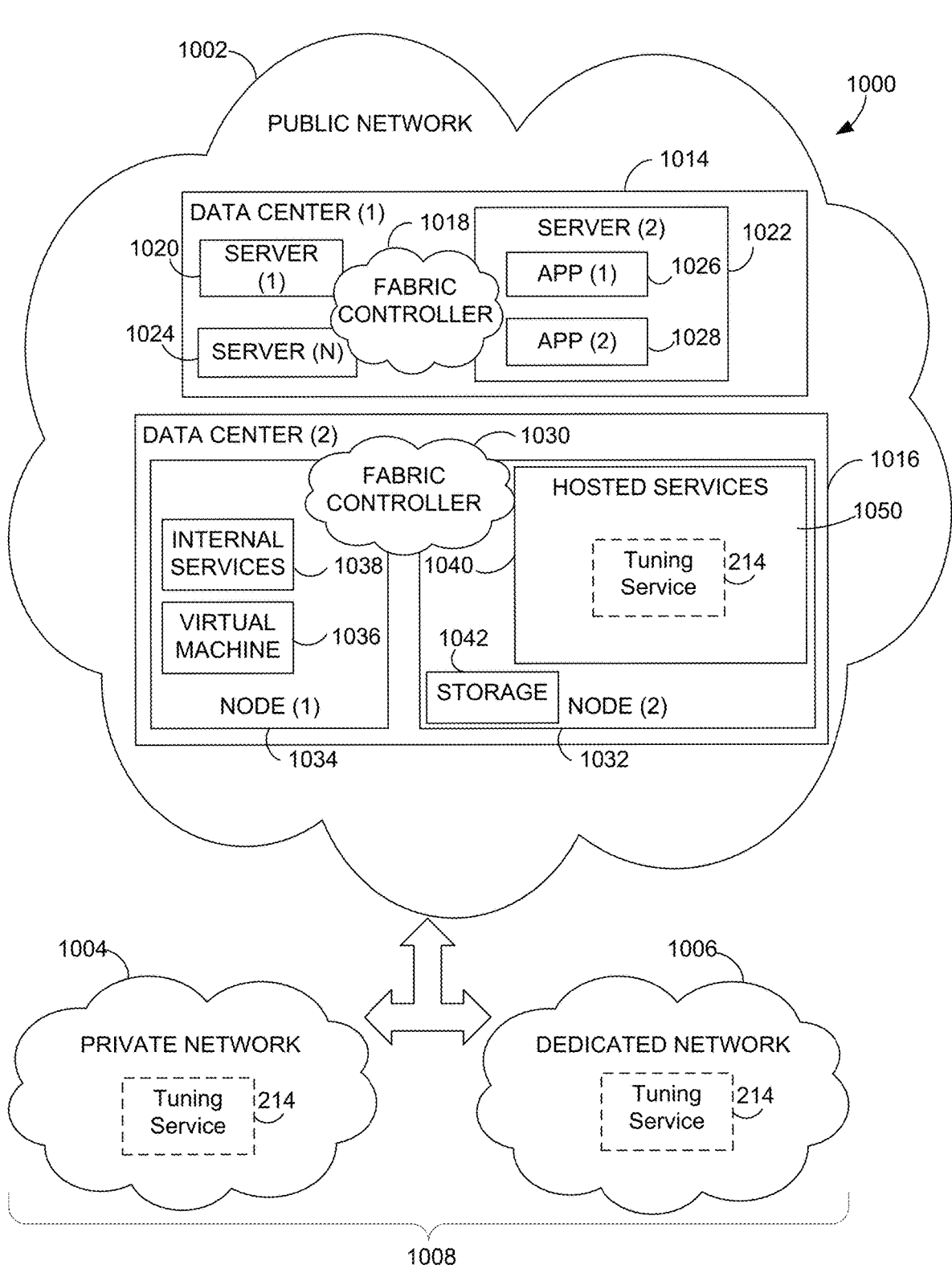
FIG. 10 illustrates a block diagram of an example cloud infrastructure.

FIG. 10 illustrates a block diagram of one example of a cloud-computing environment 1000 of a cloud infrastructure, in accordance with some of the disclosed embodiments. Cloud-computing environment 1000 includes a public network 1002, a private network 1004, and a dedicated network 1006. Public network 1002 may be a public cloud-based network of computing resources, for example. Private network 1004 may be a private enterprise network or private cloud-based network of computing resources. And dedicated network 1006 may be a third-party network or dedicated cloud-based network of computing resources.

Hybrid cloud 1008 may include any combination of public network 1002, private network 1004, and dedicated network 1006. For example, dedicated network 1006 may be optional, with hybrid cloud 808 comprised of public network 1002 and private network 1004.

Public network 1002 may include data centers configured to host and support operations, including tasks of a distributed application, according to the fabric controller 1018. It will be understood and appreciated that data center 1014 and data center 1016 shown in FIG. 10 are merely examples of suitable implementations for accommodating one or more distributed applications, and are not intended to suggest any limitation as to the scope of use or functionality of examples disclosed herein. Neither should data center 1014 and data center 1016 be interpreted as having any dependency or requirement related to any single resource, combination of resources, combination of servers (e.g., servers 1020 and 1024) combination of nodes (e.g., nodes 1032 and 1034), or a set of application programming interfaces (APIs) to access the resources, servers, and/or nodes.

Data center 1014 illustrates a data center comprising a plurality of servers, such as servers 1020 and 1024. A fabric controller 1018 is responsible for automatically managing the servers 1020 and 1024 and distributing tasks and other resources within the data center 1014. By way of example, the fabric controller 1018 may rely on a service model (e.g., designed by a customer that owns the distributed application) to provide guidance on how, where, and when to configure server 1022 and how, where, and when to place application 1026 and application 1028 thereon. One or more role instances of a distributed application may be placed on one or more of the servers 1020 and 1024 of data center 1014, where the one or more role instances may represent the portions of software, component programs, or instances of roles that participate in the distributed application. In other examples, one or more of the role instances may represent stored data that are accessible to the distributed application.

Data center 1016 illustrates a data center comprising a plurality of nodes, such as node 1032 and node 1034. One or more virtual machines may run on nodes of data center 1016, such as virtual machine 1036 of node 1034 for example. Although FIG. 10 depicts a single virtual node on a single node of data center 1016, any number of virtual nodes may be implemented on any number of nodes of the data center in accordance with illustrative embodiments of the disclosure. Generally, virtual machine 1036 is allocated to role instances of a distributed application, or service application, based on demands (e.g., amount of processing load) placed on the distributed application. As used herein, the phrase "virtual machine," or VM, is not meant to be limiting, and may refer to any software, application, operating system, or program that is executed by a processing unit to underlie the functionality of the role instances allocated thereto. Further, the VMs 1036 may include processing capacity, storage locations, and other assets within the data center 1016 to properly support the allocated role instances.

In operation, the virtual machines are dynamically assigned resources on a first node and second node of the data center, and endpoints (e.g., the role instances) are dynamically placed on the virtual machines to satisfy the current processing load. In one instance, a fabric controller 1030 is responsible for automatically managing the virtual machines running on the nodes of data center 1016 and for placing the role instances and other resources (e.g., software components) within the data center v16. By way of example, the fabric controller 1030 may rely on a service model (e.g., designed by a customer that owns the service application) to provide guidance on how, where, and when to configure the virtual machines, such as VM 1036, and how, where, and when to place the role instances thereon.

As described above, the virtual machines may be dynamically established and configured within one or more nodes of a data center. As illustrated herein, node 1032 and node 1034 may be any form of computing devices, such as, for example, a personal computer, a desktop computer, a laptop computer, a mobile device, a consumer electronic device, a server, and like. VMs machine(s) 1036, while simultaneously hosting other virtual machines carved out for supporting other tenants of the data center 1016, such as internal services 1038, hosted services 1040, and storage 1042. Often, the role instances may include endpoints of distinct service applications owned by different customers.

In some embodiments, the hosted services 1040 include a tuning service 214 configured to perform the various features discussed herein. In particular, the tuning service 1050 may be implemented via executable instructions (code), middleware, hardware, or a combination thereof. In operation, the tuning service 214 causes one or more central processing units (CPUs), graphical processing units (GPUs), VMs, quantum processors, or other processing units to specifically and automatically tune the disclosed operational parameters of the cloud infrastructure.

In operation, the tuning service 214 is configured to fully automate cluster configuration to be fully data- and model-driven. Tuning service 214 leverages a mix of domain knowledge and principled data-science to capture the essence of our cluster dynamic behavior in a collection of descriptive ML models. These models power automated optimization procedures for parameter tuning and inform user about some of the most tactical and strategical engineering/capacity decisions (such as hardware and data center design, software investments, etc.). Additionally, the tuning service 214 combines rich observational models (e.g., models collected without modifying the system) with judicious use of flighting (testing in production). This allows the tuning service 214 to support a broad range of applications that discussed herein.

In some embodiments, the tuning service 214 includes three main components: the performance monitor 218, the experimenter 220, the modeler 222, the flighting tool 224, and the deployment tool 226. In some implementations, the performance module 218 joins the data from various sources and calculates the performance metrics of interest, providing a fundamental building block for all the analysis. An end-to-end data orchestration pipeline is developed and deployed in production to collect data on a daily basis. The modeler 222 proposes the optimal configurations. Depending on applications, different methods can be used, such as machine learning, optimization, statistical analysis and econometric models. The flighting tool 224 facilitates the deployment of configuration changes to any machine in the production cluster, and the deployment tool 226 deploys the configuration settings.

The tuning service 214, and its modules 218-226, may be partially or wholly operated in the public network 1002, private network 1004, and/or dedicated network 1006. For example, the performance monitor 218 may be a service run in the public network 1002, but the modeler 222 and flighting tool 224 may be run in the private network 1004. In another example, all of the modules 218-226 may operate in the public network 1002.

Typically, each of the nodes include, or is linked to, some form of a computing unit (e.g., CPU, GPU, VM, micropro- cessor, etc.) to support operations of the component(s) running thereon. As utilized herein, the phrase "computing unit" generally refers to a dedicated computing device with processing power and storage memory, which supports operating software that underlies the execution of software, applications, and computer programs thereon. In one instance, the computing unit is configured with tangible hardware elements, or machines, that are integral, or oper- ably coupled, to the nodes to enable each device to perform a variety of processes and operations. In another instance, the computing unit may encompass a processor (not shown) coupled to the computer-readable medium (e.g., computer storage media and communication media) accommodated by each of the nodes.

The role of instances that reside on the nodes may be to support operation of service applications, and thus they may be interconnected via APIs. In one instance, one or more of these interconnections may be established via a network cloud, such as public network 1002. The network cloud serves to interconnect resources, such as the role instances, which may be distributed across various physical hosts, such as nodes 1032 and 1034. In addition, the network cloud facilitates communication over channels connecting the role instances of the service applications running in the data center 1016. By way of example, the network cloud may include, without limitation, one or more communication networks, such as LANs and/or wide area networks WANs. Such communication networks are commonplace in offices, enterprise-wide computer networks, intranets, and the Inter- net, and therefore need not be discussed at length herein.

Figure 11:
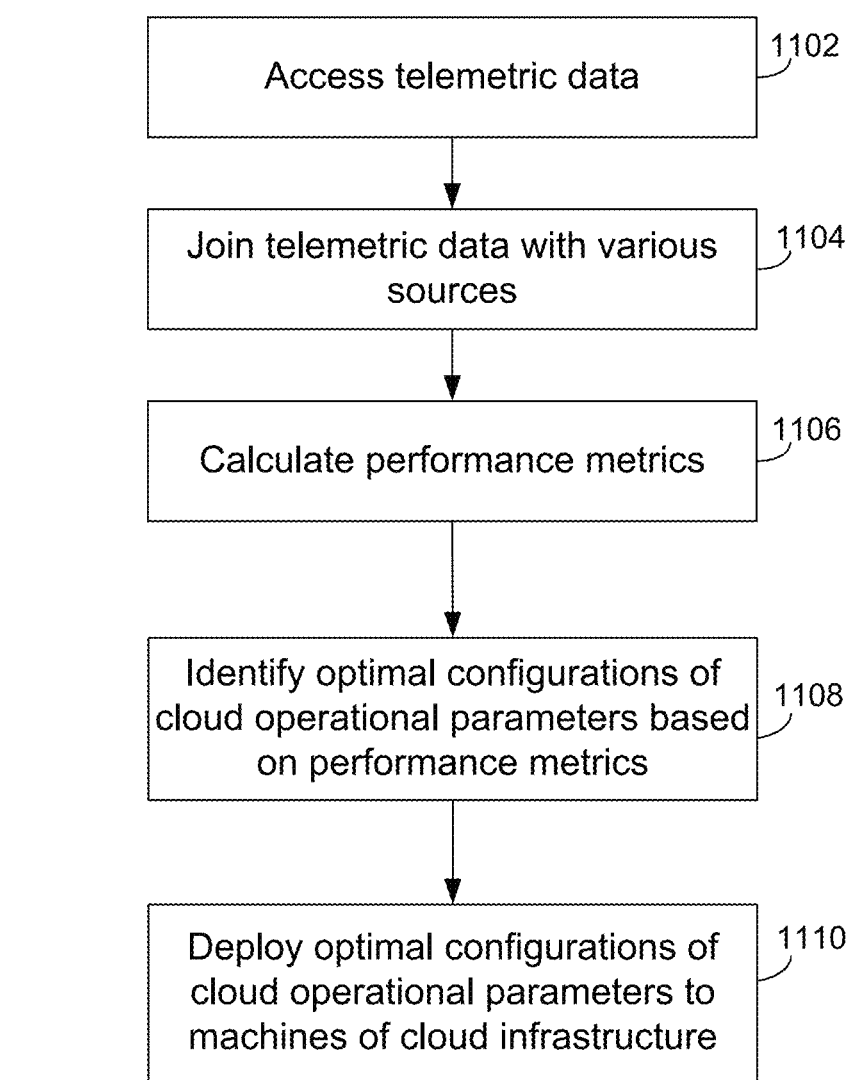
FIGS. 11-12 are flowchart diagrams of workflow for automatically tuning a large-scale cloud environment.

FIG. 11 is a flowchart diagram of a workflow 1100 for automatically tuning a large-scale cloud infrastructure. As shown at 1102, telemetric data is accessed. The performance monitor may join the telemetric data from various sources (as shown at 1104) and calculate performance metrics of the cloud infrastructure based on the telemetric data (as shown at 1106). The modeler may identify one or more optimal configurations of cloud operational parameters for the cloud environment based on the performance metrics, as shown at 1108. The flighting tool and deployment tools are configured to pre-process and deploy, respectively, the one or more optimal configurations of the cloud operational parameters to one or more machines of the cloud infrastructure, as shown at 1110.

Figure 12:
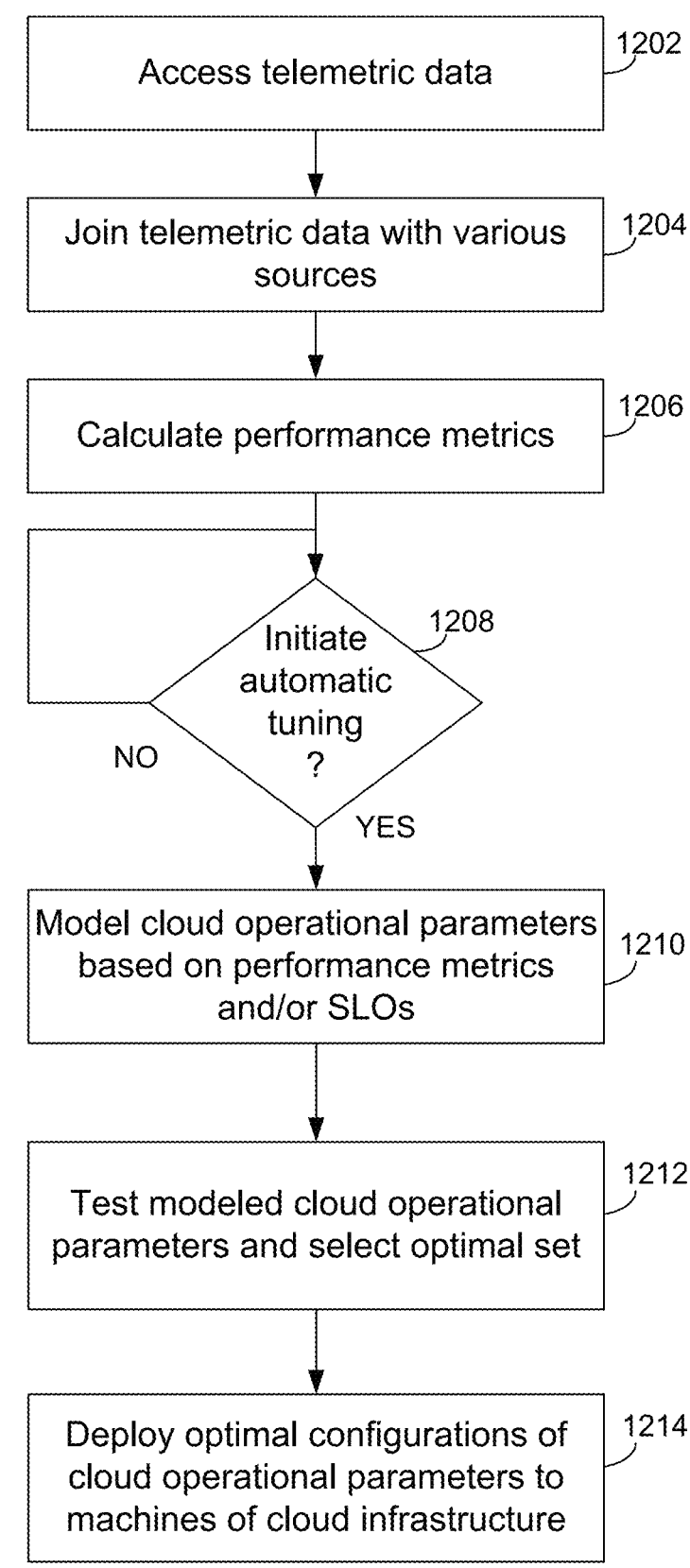

FIG. 12 is a flowchart diagram of a workflow 1200 for automatically tuning a large-scale cloud infrastructure. As shown at 1202, telemetric data is accessed. The performance monitor may join the telemetric data from various sources (as shown at 1204) and calculate performance metrics of the cloud infrastructure based on the telemetric data (as shown at 1206). The tuning service may initiate automatic tuning of the cloud environment, either on its own (e.g., periodically or conditionally based on a performance event, such as processing, memory, or networking resources exceeding certain performance thresholds); to accommodate a particu- lar processing job (e.g., an application upgrade, deep learn- ing job, redundancy backup, or the like); or upon developer initiation. As shown by decision box 1208, the tuning service waits until automatic tuning is initiated.

Once automatic tuning is initiated, the modeler generates (or "models") configurations of cloud operational param- eters for the cloud environment based on the performance metrics, as shown at 1210. The experimenter tests the configurations of the cloud operational parameters in a subset of servers and selects an optimal set of the cloud parameters based on performance metrics of the subset of the servers once the operational parameters are applied, as shown at 1212. These optimal set may be pre-processed by a flighting tool and then deployed by the deployment tool to the cloud environment, as shown at 1214.

Additional Examples

Some examples are directed to a method for automatically tuning a cloud environment comprising a plurality of serv- ers. The method comprises: accessing telemetric data of the cloud environment; accessing a plurality of operational parameters for the cloud environment; modeling a group of the operational parameters for operating the cloud environ- ment; testing the modeled group of the operational param- eters in a subset of the servers; selecting the modeled group of the operational parameters for use in tuning the cloud environments based on said testing; and deploying the modeled group of the operational parameters into the cloud environment.

Some examples build one or more machine learning (ML) models from the accessed telemetric data.

Some examples apply the one or more ML models to a subset group of the plurality of servers to calculate the performance metrics of the cloud infrastructure.

In some examples, the telemetric data comprises total bytes read by the cloud infrastructure per a quantity of time.

In some examples, the telemetric data comprises a ratio based on a total amount of data read and a total execution time per machine of the cloud infrastructure.

In some examples, the telemetric data comprises a ratio based on a total amount of data read and a total CPU time per machine of the cloud infrastructure.

In some examples, the telemetric data comprises an average time running containers in the cloud infrastructure.

In some examples, the cloud infrastructure is a large-scale cloud-computing environment that processes at least an exabyte of data on a daily basis.

Other examples are directed to a system for automatically tuning a cloud environment comprising a plurality of serv- ers. The system comprises: memory embodied with execut- able instructions for performing said tuning of the cloud infrastructure; and one or more processors programmed for: calculating performance metrics of the cloud infrastructure based on the telemetric data; generating one or more con- figurations of cloud operational parameters for the cloud environment based on the performance metrics, testing the one or more configurations of the cloud operational param- eters in a subset of the one or more servers, selecting an optimal set of the cloud parameters based on performance metrics of the subset of the one or more servers once the operational parameters are applied, and deploying the opti- mal set of the cloud operational parameters to one or more servers of the cloud environment In some examples, the telemetric data is collected daily.

In some examples, the one or more processors are pro- grammed for building one or more machine learning (ML) models from the accessed telemetric data.

In some examples, the one or more processors are pro- grammed for applying the one or more ML models to a subset group of the plurality of machines to calculate the performance metrics of the cloud infrastructure.

In some examples, the telemetric data comprises total bytes read by the cloud infrastructure per a quantity of time.

In some examples, the quantity of time is an hour.

In some examples, the telemetric data comprises total number of tasks finished per a quantity of time.

Other examples are directed to one or more computer-readable memory devices embodied with modules that are executable by one or more processors for automatically tuning a cloud environment comprising a plurality of servers. The modules comprising: a performance monitor configured to join telemetric data from various sources and calculate performance metrics of the cloud infrastructure based on the telemetric data; a modeler configured to generate one or more configurations of cloud operational parameters for the cloud environment based on the performance metrics; an experimenter configured to test the one or more configurations of the cloud operational parameters in a subset of the one or more servers and select an optimal set of the cloud parameters based on performance metrics of the subset of the one or more servers once the operational parameters are applied; and a deployment tool configured to deploy the optimal set of the cloud operational parameters to one or more servers of the cloud environment.

In some examples, the modeler applies an artificial intelligence (AI) algorithm to the performance metrics for generating the one or more configurations of cloud operational parameters.

In some examples, the one or more configurations of cloud operational parameters comprise a quantity of processing resources to use for a processing job.

In some examples, the one or more configurations of cloud operational parameters comprise a quantity of processing jobs to run on one CPU.

In some examples, the telemetric data comprises total number of tasks finished per a quantity of time.

The examples and embodiments disclosed herein may be described in the general context of computer code or machine-useable instructions, including computer-executable instructions such as program components, being executed by a computer or other machine, such as a personal data assistant or other handheld device. Generally, program components including routines, programs, objects, components, data structures, and the like, refer to code that performs particular tasks, or implement particular abstract data types. The disclosed examples may be practiced in a variety of system configurations, including personal computers, laptops, smart phones, mobile tablets, hand-held devices, consumer electronics, servers, VMs, specialty computing devices, etc. The disclosed examples may also be practiced in distributed computing environments where tasks are performed by remote-processing devices that are linked through a communications network.

While the aspects of the disclosure have been described in terms of various examples with their associated operations, a person skilled in the art would appreciate that a combination of operations from any number of different examples is also within scope of the aspects of the disclosure.

The order of execution or performance of the operations in examples of the disclosure illustrated and described herein is not essential, and may be performed in different sequential manners in various examples. For example, it is contemplated that executing or performing a particular operation before, contemporaneously with, or after another operation is within the scope of aspects of the disclosure.

In embodiments involving a general-purpose computer, aspects of the disclosure transform the general-purpose computer into a special-purpose computing device when configured to execute the instructions described herein.

The embodiments illustrated and described herein as well as examples not specifically described herein but within the scope of aspects of the disclosure constitute exemplary means for authenticating a client to automatically tune a cloud.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of" The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A computer-implemented method comprising:

monitoring performance metrics associated with a cloud environment, wherein the cloud environment is abstracted through multiple levels from a full system level to a machine group level;

based on the performance metrics and a service level objective criterion, generating, by a modeler, a plurality of different combinations of operational parameters associated with the cloud environment;

calibrating a machine learning (ML) model based on the plurality of different combinations of operational parameters;

running the plurality of different combinations of the operational parameters on a test group of servers executing the calibrated ML model to evaluate performance of the test group of servers based on the service level objective criterion;

based on the performance evaluation, identifying a combination of the operational parameters that satisfies the service level objective criterion for use in the cloud environment; and tuning the cloud environment with the identified combination of operational parameters at the machine group level in the cloud environment.

2. The computer-implemented method of claim 1, wherein the cloud environment is abstracted through multiple levels from the full system level to a physical servers and virtual machines level to a machine level to the machine group level.

3. The computer-implemented method of claim 1, wherein the service level objective criterion includes an uptime for an application or a usage time for a graphics processing unit (GPU).

4. The computer-implemented method of claim 1, wherein the performance metrics further include central processing unit (CPU) usage data.

5. The computer-implemented method of claim 1, wherein generating the plurality of different combinations of the operational parameters comprises performing one or more of: machine learning, optimizing, and statistical analysis.

6. The computer-implemented method of claim 1, wherein the performance metrics include telemetric data, the telemetric data comprising total bytes read by the cloud environment per a quantity of time.

7. The computer-implemented method of claim 1, wherein the performance metrics include telemetric data, the telemetric data comprising a ratio based on total amount of data read and total execution time per server of the cloud environment.

8. The computer-implemented method of claim 1, wherein the performance metrics include telemetric data, the telemetric data comprising a ratio based on total amount of data read and total CPU time per server of the cloud environment.

9. The computer-implemented method of claim 1, wherein the performance metrics include telemetric data, the telemetric data comprising an average time running containers in the cloud environment.

10. The computer-implemented method of claim 1, wherein tuning the cloud environment includes (a) based on a set of parameters being tuned, identifying a set of metrics that are impacted, (b) creating a machine learning model to determine how the set of metrics affects other metrics, and (c) using a combination of the set of parameters, the identified set of metrics, and the other affected metrics to tune the cloud environment.

11. A system comprising:

a memory embodied with executable instructions; and a processor programmed to execute at least a part of the executable instructions for:

monitoring performance metrics associated with a cloud environment, wherein the cloud environment is abstracted through multiple levels from a full system level to a machine group level;

based on the performance metrics and a service level objective criterion, generating, by a modeler, a plurality of different combinations of operational parameters associated with the cloud environment;

calibrating a machine learning (ML) model based on the plurality of different combinations of operational parameters;

running the plurality of different combinations of the operational parameters on a test group of servers executing the calibrated ML model to evaluate performance of the test group of servers based on the service level objective criterion;

based on the performance evaluation, identifying a combination of the operational parameters that satisfies the service level objective criterion for use in the cloud environment; and tuning the cloud environment with the identified combination of operational parameters at the machine group level in the cloud environment.

12. The system of claim 11, wherein the processor is further programmed for:

processing the identified combination of the operational parameters prior to the tuning;

wherein the tuning comprises tuning the cloud environment with the processed identified combination of the operational parameters.

13. The system of claim 11, wherein the service level objective criterion includes an uptime for an application or a usage time for a graphics processing unit (GPU).

14. The system of claim 11, wherein the performance metrics include central processing unit (CPU) usage data.

15. The system of claim 11, wherein the processor is programmed as a modelling component, the modelling component comprising at least one of: a machine learning component, an optimizer component, and a statistical analytics component.

16. The system of claim 11, wherein the performance metrics include telemetric data, the telemetric data comprising total bytes read by the cloud environment per a quantity of time.

17. The system of claim 11, wherein tuning the cloud environment includes (a) based on a set of parameters being tuned, identifying a set of metrics that are impacted, (b) creating an machine learning model to determine how the set of metrics affect other metrics, and (c) using a combination of the set of parameters, the identified set of metrics, and the other affected metrics to tune the cloud environment.

18. A computer storage medium having computer-executable instructions that, when executed by a processor, perform the following operations:

monitor performance metrics associated with a cloud environment, wherein the cloud environment is abstracted through multiple levels from a full system level to a machine group level;

based on the performance metrics and a service level objective criterion, generate, by a modeler, a plurality of different combinations of operational parameters associated with the cloud environment;

calibrate a machine learning (ML) model based on the plurality of different combinations of operational parameters;

run the plurality of different combinations of the operational parameters on a test group of servers executing the calibrated ML model to evaluate performance of the test group of servers based on the service level objective criterion;

based on the performance evaluation, identify a combination of operational parameters that satisfies the service level objective criterion for use in the cloud environment; and tune the cloud environment with the identified combination of operational parameters at the machine group level in the cloud environment.

19. The computer storage medium of claim 18, wherein the operations further comprise:

processing the identified combination of the operational parameters prior to the tuning; and wherein the tuning comprises tuning the cloud environment with the processed identified combination of the operational parameters.

20. The computer storage medium of claim 19, wherein the service level objective criterion includes an uptime for an application or a usage time for a graphic processing unit (GPU).

* * * * *